United States Patent
Zhu et al.

(10) Patent No.: US 12,130,445 B2
(45) Date of Patent: Oct. 29, 2024

(54) ADDITIVE MANUFACTURING DEVICES AND METHODS

(71) Applicant: LUXCREO (BEIJING) INC., Beijing (CN)

(72) Inventors: Guang Zhu, Ningbo (CN); Mike Shang-Yu Yang, Belmont, CA (US); Michael Robert Strohecker, Belmont, CA (US)

(73) Assignee: LUXCREO (BEIJING) INC., Beijing (CN)

(*) Notice: Subject to any disclaimer, the term of this patent is extended or adjusted under 35 U.S.C. 154(b) by 0 days.

(21) Appl. No.: 18/190,059

(22) Filed: Mar. 24, 2023

(65) Prior Publication Data
US 2023/0236430 A1 Jul. 27, 2023

Related U.S. Application Data

(63) Continuation of application No. PCT/CN2022/097817, filed on Jun. 9, 2022.
(Continued)

(51) Int. Cl.
*B29C 64/264* (2017.01)
*B29C 64/124* (2017.01)
(Continued)

(52) U.S. Cl.
CPC ........ *G02B 27/0927* (2013.01); *B29C 64/124* (2017.08); *B29C 64/264* (2017.08);
(Continued)

(58) Field of Classification Search
CPC ... B29C 64/124; B29C 64/129; B29C 64/135; B29C 64/264; B29C 64/268;
(Continued)

(56) References Cited

U.S. PATENT DOCUMENTS

| | | | | |
|---|---|---|---|---|
| 2003/0214812 A1* | 11/2003 | Bourdelais | ........... | G02B 5/0221 362/330 |
| 2004/0066645 A1* | 4/2004 | Graf | .................... | G02B 6/0053 362/629 |

(Continued)

FOREIGN PATENT DOCUMENTS

| | | |
|---|---|---|
| CN | 108456385 A | 8/2018 |
| JP | 2006323327 A * | 11/2006 |

(Continued)

OTHER PUBLICATIONS

International Search Report in PCT/CN2022/097817 mailed on Sep. 16, 2022, 9 pages.
(Continued)

*Primary Examiner* — Jamel M Nelson
(74) *Attorney, Agent, or Firm* — METIS IP LLC

(57) ABSTRACT

In the embodiments of the present disclosure, additive manufacturing devices and methods are provided. The additive manufacturing device includes a light source, a building device, and a light scattering member. The light source is configured to provide light to cure photocurable resins. The building device includes a resin tank configured to store the photocurable resins. The building device has a building surface on which the photocurable resins are cured. The light scattering member is arranged between the light source and the building surface. The light scattering member is configured to alter a light propagation direction of the light from the light source to cause an inner-pixel light intensity change on the building surface.

23 Claims, 8 Drawing Sheets

Related U.S. Application Data

(60) Provisional application No. 63/208,543, filed on Jun. 9, 2021.

(51) Int. Cl.
  *B33Y 10/00* (2015.01)
  *B33Y 30/00* (2015.01)
  *G02B 27/09* (2006.01)

(52) U.S. Cl.
  CPC ............... *B33Y 10/00* (2014.12); *B33Y 30/00* (2014.12); *G02B 27/0938* (2013.01)

(58) Field of Classification Search
  CPC ... B29C 64/273; B29C 64/277; B29C 64/282; B29C 64/286; B29C 64/245; B29C 64/255; B29C 64/259; B33Y 10/00; B33Y 30/00; G02B 5/02; G02B 27/0927; G02B 27/0938
  See application file for complete search history.

(56) References Cited

U.S. PATENT DOCUMENTS

| | | |
|---|---|---|
| 2013/0295215 A1 | 11/2013 | Wu et al. |
| 2016/0193786 A1* | 7/2016 | Moore ............... B29C 64/135 |
| | | 425/162 |
| 2017/0210072 A1* | 7/2017 | Rodriguez ............... G02B 1/12 |
| 2018/0065302 A1 | 3/2018 | Arai et al. |
| 2019/0292368 A1 | 9/2019 | Li et al. |
| 2020/0324466 A1 | 10/2020 | Nishida et al. |
| 2022/0063193 A1* | 3/2022 | Jou ............... B32B 25/20 |
| 2022/0339827 A1* | 10/2022 | Zhu ............... B29C 64/245 |

FOREIGN PATENT DOCUMENTS

| | | |
|---|---|---|
| JP | 2006323327 A | 11/2006 |
| WO | 2011027903 A1 | 3/2011 |
| WO | 2017127334 A1 | 7/2017 |
| WO | 2020020547 A1 | 1/2020 |

OTHER PUBLICATIONS

Written Opinion in PCT/CN2022/097817 mailed on Sep. 16, 2022, 6 pages.

Notice of Acceptance for Patent Application in Australian Application No. 2022291205 mailed on Jun. 4, 2024, 3 pages.

\* cited by examiner

ADDITIVE MANUFACTURING DEVICES AND METHODS

CROSS-REFERENCE TO RELATED APPLICATIONS

This application is a Continuation of International Application No. PCT/CN2022/097817, filed on Jun. 9, 2022, which claims priority to U.S. Provisional Patent Application 63/208,543, filed on Jun. 9, 2021, the entire contents of each of which are incorporated herein by reference.

TECHNICAL FIELD

The present disclosure relates to additive manufacturing, and in particular to additive manufacturing devices and methods.

BACKGROUND

Additive manufacturing (AM), commonly known as three-dimensional (3D) printing, is used to produce physical objects by layer-by-layer accumulation. Photocurable additive manufacturing uses liquid photocurable resins as raw materials and undergoes a curing reaction under the irradiation of ultraviolet light of a certain wavelength to form a cured layer. Cured layers are accumulated layer by layer to finally form a desired 3D object.

The transparent 3D object printed by additive manufacturing has a wide range of applications. For example, transparent retainers printed by additive manufacturing are widely used in orthodontics. However, how to print 3D objects with high transparency and resolution is still a problem in the relevant industry.

SUMMARY

According to an aspect of the present disclosure, an additive manufacturing device is provided. The additive manufacturing device includes a light source, a building device, and a light scattering member. The light source is configured to provide light to cure photocurable resins. The building device includes a resin tank configured to store the photocurable resins. The building device has a building surface on which the photocurable resins are cured. The light scattering member is arranged between the light source and the building surface. The light scattering member is configured to alter a light propagation direction of the light from the light source to cause an inner-pixel light intensity change on the building surface.

In some embodiments, a first transparency T1 of a first print may be formed by curing the photocurable resins on the building surface by the light that passes through the light scattering member. A second transparency T2 of a second print may be formed by curing the photocurable resins on the building surface by the light that does not pass through the light scattering member. The first transparency T1 may be greater than the second transparency T2.

In some embodiments, the building device may further include a build platform configured to move in a direction away from the light source to cause the cured photocurable resins to move away from the building surface.

In some embodiments, a first ratio A1 may be a ratio of a maximum value to a minimum value of a light intensity, in a single pixel on the building surface, wherein the single pixel is formed by the light that passes through the light scattering member. A second ratio A2 may be a ratio of a maximum value to a minimum value of a light intensity, in a single pixel on the building surface, wherein the single pixel is formed by the light that does not pass through the light scattering member. The first ratio A1 of at least one pixel is less than the second ratio A2 of at least one pixel.

In some embodiments, a first full-width at half of maximum (FWHM1) may be a full-width at half of maximum (FWHM) of a Gaussian distribution curve of a light intensity, in a single pixel on the building surface, wherein the single pixel is formed by the light that passes through the light scattering member. A second full-width at half of maximum (FWHM2) may be an FWHM of a Gaussian distribution curve of a light intensity, in a single pixel on the building surface, wherein the single pixel is formed by the light that does not pass through the light scattering member. The FWHM1 of at least one pixel may be greater than the FWHM2 of at least one pixel.

In some embodiments, the light source may be a liquid crystal display light source or a light source of a digital light processing projection device.

In some embodiments, the light scattering member may include a light uniforming device. A distance between the light uniforming device and the building surface may be less than a distance between the light uniforming device and the light source. The light uniforming device may be configured to adjust a distribution of an inner-pixel light intensity of the light source.

In some embodiments, the light uniforming device may include a light source profile modifier arranged on a light path of the light source and configured to modify profiles of the one or more pixels of the light source. The light source is a liquid crystal display light source.

In some embodiments, the light uniforming device may include a light uniforming sheet.

In some embodiments, the light uniforming device may include a glass structure. The glass structure may include frosted glass, sandblasted glass, or etched glass.

In some embodiments, in response to that a size of a pixel is X μm, a surface roughness Ra of the glass structure may be X–5×X μm.

In some embodiments, the light uniforming device may include a light source shifter. The light source may be a digital light processing projection device. The light source shifter may be configured to shift a display chip of the digital light processing projection device.

In some embodiments, the light scattering member may include a transparent scattering layer arranged between the building surface and the light source and capable of scattering passing beams.

In some embodiments, the scattering layer may constitute the building surface.

In some embodiments, the scattering layer may include a substrate and a microstructure arranged on the substrate. The microstructure may include at least one of surface textures, micropores, fiber structures, or nano-particles.

In some embodiments, the surface textures may include surface protrusions or depressions arranged in an array. In some embodiments, the surface textures may include wavy or jagged textures.

In some embodiments, a feature size of the surface textures may be within a range of 10 nm~20 μm.

In some embodiments, the micropores may include closed pores formed inside the scattering layer. In some embodiments, the micropores may include half-open pores formed on a surface of the scattering layer.

In some embodiments, a diameter of the micropores may be within a range of 2 nm-20 μm.

In some embodiments, the substrate may include a substrate layer. The fiber structures may be deposited inside the substrate layer. A difference between a refractive index of the substrate layer and a refractive index of the fiber structures may be less than a refractive index of the fiber structures by 20%.

In some embodiments, a ratio of a total volume of the fiber structures to a volume of the scattering layer may be within a range of 5%-90%.

In some embodiments, a ratio of a total weight of the fiber structures to a weight of the scattering layer may be within a range of 5%-90%.

In some embodiments, an average value of maximum distances each of which is between two adjacent fiber structures may be within a range of 0.05 μm-50 μm.

In some embodiments, an average length of the fiber structures may be within a range of 0.1-30 mm.

In some embodiments, a ratio of a total volume of the nano-particles to a total volume of the scattering layer may be within a range of 1%-30%.

In some embodiments, a ratio of a total weight of the nano-particles to a total weight of the scattering layer may be within a range of 1%-30%.

In some embodiments, an average value of distances each of which is between two adjacent nano-particles may be within a range of 0.05 μm-50 μm.

In some embodiments, an average particle diameter of the nano-particles may be within a range of 1-100 mm.

In some embodiments, the scattering layer may be a composite layer having a plurality of layers.

In some embodiments, the composite layer may include a polydimethylsiloxane (PDMS) layer and a paper layer.

In some embodiments, the composite layer may include a PDMS layer and a polymer film having a microstructure.

In some embodiments, the composite layer may be a release film. The release film may include a plastic layer and an elastic layer.

In some embodiments, the plastic layer may include polytetrafluoroethylene (PTFE), polyethylene (PE), polyvinylidene fluoride (PVDF), fluorinated ethylene propylene (FEP), perfluoroalkoxy resin (PFA), polychlorotrifluoroethylene (PCTFE), ethylene-tetrafluoroethylene copolymer (ETFE), polyvinyl fluoride (PVF), polyethylene terephthalate (PET), polybutadiene formaldehyde (PBT), thermoplastic polyurethane (TPU), polyamide (PA) or nylon, polyimide (PI), polypropylene (PP), polyvinyl chloride (PVC), poly Methyl methacrylate (PMMA), polystyrene (PS), polybutylene (PB), polyoxymethylene (POM), polycarbonate (PC), polysulfone (PSU), polyphenylene oxide (PPO), polyvinyl alcohol (PVA), polyacrylonitrile styrene (AS), polyacrylonitrile butadiene styrene (ABS), or fluororesin (FR), or any combination thereof, or any polymer thereof, or any blend polymer thereof, or any block polymer thereof, or any interpenetrating network polymer thereof.

In some embodiments, the elastic layer may include an elastic medium and a reinforcing scaffold. The elastic medium may fill in pores of the reinforcing scaffold.

In some embodiments, a material of the reinforcing scaffold of the elastic layer may include PE, PVDF, FEP, PFA, PCTFE, ETFE, PVF, PET, PBT, TPU, PA or nylon, PI, PP, PVC, PMMA, PS, PB, POM, PC, PSU, PPO, PVA, AS, ABS, or FR, or any combination thereof, or any polymer thereof, or any blend polymer thereof, or any block polymer thereof, or any interpenetrating network polymer thereof.

In some embodiments, a material of the elastic medium of the elastic layer may include a polyester elastomer, a propylene-based elastomer, a styrene-based elastomer, an olefin-based elastomer, a diene-based elastomer, a vinyl-chloride-based elastomer, a lipid-based elastomer, an amide-based elastomer, a silicone polymer, an epoxy polymer, a silicone-based elastomer, a fluorine-based elastomer, silicone, rubber, silicone rubber, thermoplastic vulcanized rubber (TPV), nitrile-butadiene rubber (NBR), butyl rubber, TPU, thermoplastic polyether ester elastomer (TPEE), thermoplastic polyamide elastomer (TPAE), T-NR-trans polyisoprene rubber (TPI), syndiotactic 1,2-polybutadiene (TPB), an organic fluorine thermoplastic elastomer (TPF), thermoplastic phenolic resin (Novalc resin), thermoplastic chlorinated polyethylene (TCPE), methylchlorosilane, ethylchlorosilane, phenylchlorosilane, thermoplastic polyvinyl chloride elastomer, PDMS, polyethylene, polystyrene, polybutadiene, polyurethane, polyisoprene, polyolefin elastomer (POE), ethylene-propylene-diene rubber (EPDM), styrenic thermoplastic rubber (SEBS, SBS), polyether block amide (PEBA), ethylene-vinyl acetate copolymer (EVA, EVM), linear low-density polyethylene (LLDPE), polyacrylic rubber, fluorosilicone rubber, or fluoroelastomer, or any combination thereof, or any polymer thereof, or any blend polymer thereof, or any block polymer thereof, or any interpenetrating network polymer thereof.

In some embodiments, the scattering layer may be at least a part of a bottom surface of the resin tank.

In some embodiments, the scattering layer may be made of a flexible material and/or elastic material.

In some embodiments, a transparency of the scattering layer may be within a range of 40%-100%.

In some embodiments, the scattering layer may be made of at least one of natural rubber, synthetic rubber, polytetrafluoroethylene, polyurethane, polybutadiene, polyisobutylene, neoprene, silicon resin, polyperfluoroethylene propylene, ethylene-chlorotrifluoroethylene copolymer, polyvinylidene fluoride, ethylene-tetrafluoroethylene copolymer, tetrafluoroethylene-vinylidene fluoride copolymer, chlorotrifluoroethylene-vinylidene fluoride copolymer, o-phenylphenol, polyterephthalic acid, polyisoprene, polyacrylic rubber, fluorosilicone rubber, fluororubber, methyl chlorosilane, ethyl chlorosilane, phenyl chlorosilane, polytrifluorochloroethylene, polytetrafluoroethylene, polyvinylidene fluoride, polyvinyl fluoride, polytrichloroethylene, perfluoroalkyl polyether, hexafluoropropylene, fluorinated polyvinyl chloride, poly(4-methyl-1-pentene), PDMS, or any derivative thereof.

In some embodiments, an elastic modulus of the scattering layer may be within a range of 1-50 MPa.

In some embodiments, a tensile strength of the scattering layer may be within a range of 5-50 MPa.

In some embodiments, an elongation at break of the scattering layer may be within a range of 50%-800%.

In some embodiments, the additive manufacturing device may be configured to manufacture a transparent orthodontic dental appliance.

According to another aspect of the present disclosure, an additive manufacturing method for performing additive manufacturing based on the additive manufacturing device is provided. The additive manufacturing method includes placing photocurable resins in a resin tank of a building device and curing the photocurable resins by irradiating the light that is emitted by a light source and scattered by a light scattering member onto the photocurable resins.

Based on the structure of the additive manufacturing device described above, a light image formed by the light source on the building surface may be composed of a plurality of pixels. For a single pixel, the light intensity in the pixel may vary with the inner-pixel location, the light intensity may be weak in an edge region of the pixel, and the light intensity may be strong in a center region of the pixel. In the present disclosure, after the light emitted from the light source is scattered by the light scattering member, due to the change of an angle of the light, the light intensity in the edge region of a single pixel may be enhanced and the light intensity in the center region of the single pixel may be weakened, accordingly, boundaries between the pixels may be blurred, thereby reducing protrusions and depressions on a surface of printed 3D object and improving the transparency of the printed 3D object.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

Figure 1A:
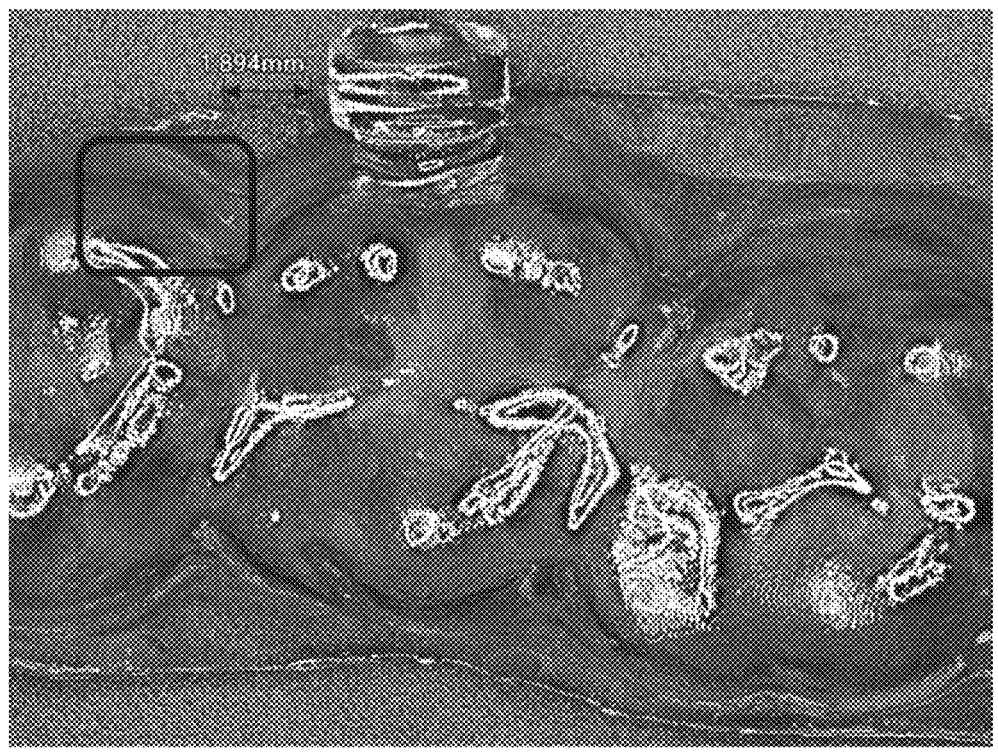
FIG. 1A is a schematic diagram illustrating a printing effect of an additive manufacturing device according to some embodiments of the present disclosure.
Figure 1A:

Reference numerals and represented structures: 1—additive manufacturing device, 10—light source, 20—building device, 21—resin tank, 22—building surface, 23—build platform, 231—plane, 30—light scattering member, 40—photocurable resins, 50—3D object.

DETAILED DESCRIPTION

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that "system", "device", "unit" and/or "module" as used herein is a method for distinguishing different components, elements, parts, portions or assemblies of different levels. However, the words may be replaced by other expressions if other words can achieve the same purpose.

As indicated in the disclosure and claims, the terms "a", "an", "an" and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

The flowchart is used in the present disclosure to illustrate the operations performed by the system according to the embodiments of the present disclosure. It should be understood that the preceding or following operations are not necessarily performed in the exact order. Instead, various steps may be processed in reverse order or simultaneously. Meanwhile, other operations may be added to these procedures, or a certain step or steps may be removed from these procedures.

Additive manufacturing technology (also known as 3D printing technology) is widely used in various fields. For example, medical supplies such as dental retainers, bone scaffolds, heart valves, vascular scaffolds, and cartilage tissue may be produced by additive manufacturing technology. As another example, daily necessities such as shoe soles, insoles, and pillows may be produced by additive manufacturing technology. As yet another example, artwares such as desktop ornaments and models may be produced by additive manufacturing technology. In some embodiments, products may be printed by additive manufacturing processes such as fused deposition, laser sintering, and photocuring. The photocuring has a good application prospect. The photocuring has the advantages of a high degree of automation, the good surface quality of manufactured products, high dimensional accuracy, and the ability to achieve relatively fine dimensions. The photocuring may be used to print products with a certain transparency.

The fused deposition may be a molding process in which filamentous materials (e.g., thermoplastics, wax or metal fuses) are extruded from a heated nozzle and deposited at a fixed rate according to a predetermined trajectory of each layer of a product. The laser sintering may be a molding technology in which a powder compact is sintered with a laser as a heat source.

The photocuring may be an additive manufacturing technology in which a laser with a specific wavelength and intensity is focused on a surface of a photocurable material to make the photocurable material cure quickly. Using a liquid printing raw material as a raw material, the photocuring uses the photocurable characteristics that the liquid printing raw material will cure quickly under the irradiation of laser beams of the specific wavelength and intensity to realize the printing of objects. At present, stereolithography (SLA) technology, digital light processing (DLP) technology, and liquid crystal display (LCD) technology are also applied to photocuring printing, thereby improving printing accuracy. The SLA technology may cure liquid printing raw material using a laser-guided by a galvanometer. The DLP technology may project digitally processed image signals with light. The DLP technology may cure the liquid printing raw material using a digital light projector. The digital light projector may project an image of an entire layer onto a bottom of a container containing a photocurable raw material. A digital micromirror device (DMD) may selectively guide light. The DMD may be an assembly consisting of thousands of micromirrors. The LCD technology may produce images with different gray levels and colors using the photoelectric effect of liquid crystals. Compared with the DLP technology, the LCD technology may project a complete layer on the container containing the photocurable raw material, but the light may be emitted through the LCD instead of an LED array of the digital light projector. A screen of the LCD may act as a mask to show only a light image needed for a current layer. In some embodiments, the light source may be an LCD light source or a light source of a DLP device (e.g., a digital light projector), or the like. In some embodiments, the light source may be an ultraviolet laser, and the printing raw material may be irradiated by ultraviolet light of a specific wavelength (250 nm-400 nm) to cause a polymerization reaction to complete curing.

In some embodiments, the light image formed on a building surface by the light source of the SLA technology, the DLP technology, and the LCD technology may be composed of a plurality of pixels. For one single pixel of the plurality of pixels, a light intensity may vary with the inner-pixel location, the light intensity may be weak in an edge region of the pixel, and the light intensity may be strong in a center region of the pixel.

In some embodiments, photocuring printing may include the following steps: step 1, a 3D model may be layered in one direction to obtain contour information or image information of each layer; step 2, a light pattern may be irradiated on a printing raw material by a light source; step 3, the printing raw material undergoes a polymerization reaction (photocuring) under light irradiation to form a cured layer; after the light pattern of the layer is cured, the above steps 2 and 3 are repeated to cure the light pattern of a next layer until the light pattern of the last layer of the 3D model is cured, a complete print is formed. The raw material for photocuring printing may be photocurable resins.

In some embodiments, photocuring printing may produce a 3D object by top-down layer-by-layer stacking. Merely by way of example, the top-down layer-by-layer stacking may refer to that the light source is placed above the building surface (i.e., above an upper surface of the liquid photocurable resins), and a current cured layer is formed on an upper surface of a previous formed cured layer. In some embodiments, the additive manufacturing device may manufacture the 3D object by top-down layer-by-layer stacking. Merely by way of example, the top-down layer-by-layer stacking may refer to that the light source is placed under the building surface (i.e., under a lower surface of the liquid photocurable resins), and the current cured layer is formed on a lower surface of the previous formed cured layer.

In some embodiments, the photocuring may be used to print products with a certain transparency. In some embodiments, in order to meet the requirement of the high transparency of the printed object, in addition to using a resin material with high transparency, the transparency of the printed object may be improved through post-processing, for example, grinding, polishing, transparent paint spraying, or transparent resin impregnation, or the like. However, when the transparent or translucent resin is used, it may be very difficult to precisely control light transmission and curing depth. During the printing process, light in an ultraviolet or visible wavelength range not only irradiates the liquid resin in the current cured layer to form the current cured layer, but also transmits through the liquid resin in the current cured layer to a previous cured layer, thereby resulting in undesired curing, which may reduce the resolution of the 3D object in a direction perpendicular to the photocuring building surface, thereby affecting the transparency of the printed product.

Figure 1B:
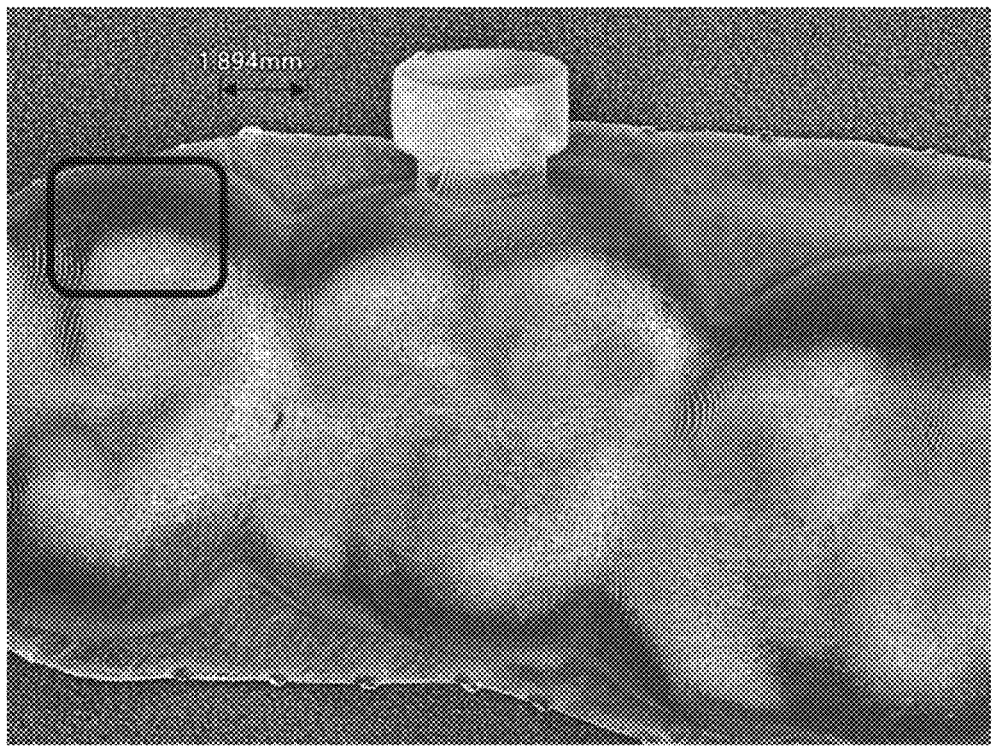
FIG. 1B is a schematic diagram illustrating a printing effect of an additive manufacturing device according to some embodiments of the present disclosure.
Figure 1B:
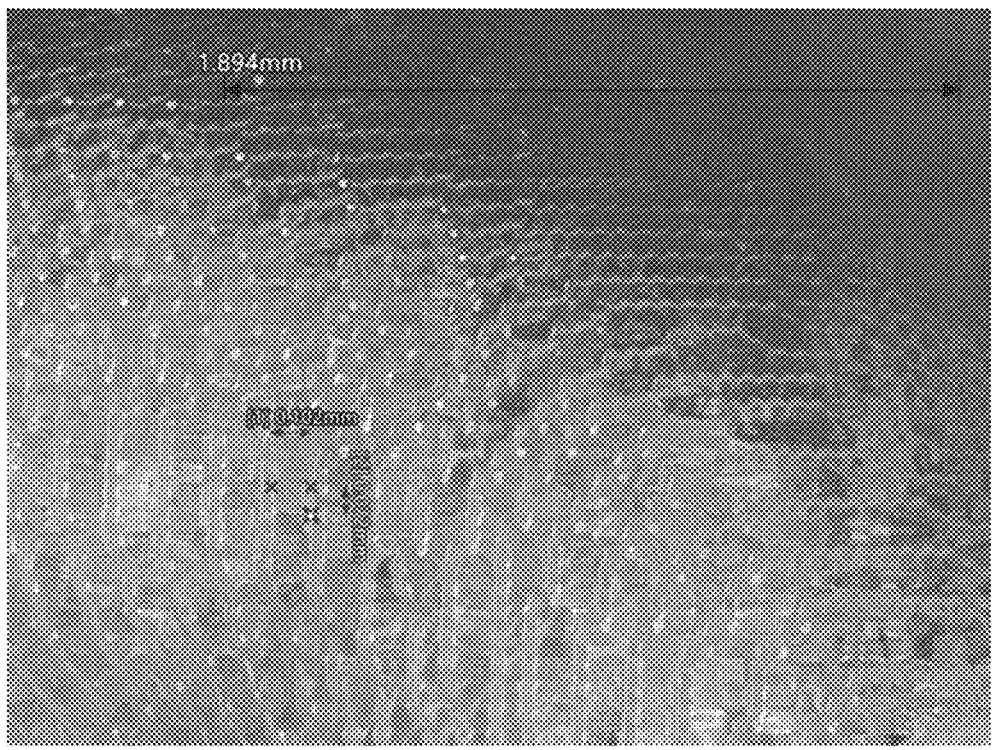
Figure 1C:
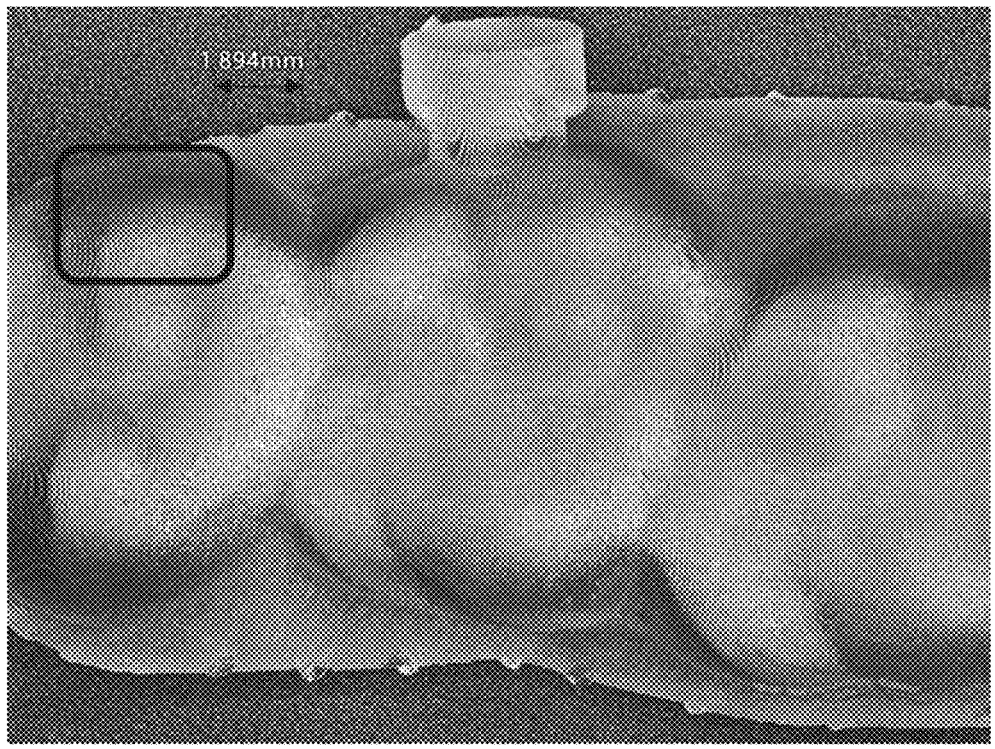
FIG. 1C is a schematic diagram illustrating a printing effect of an additive manufacturing device according to some embodiments of the present disclosure.
Figure 1C:
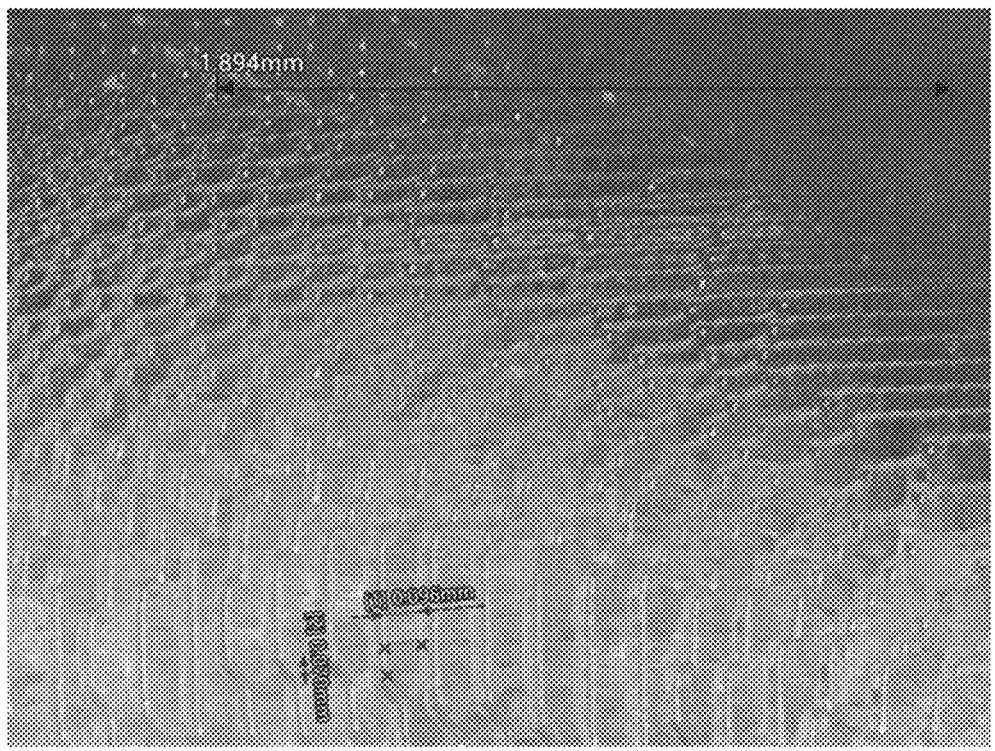

FIG. 1A is a schematic diagram illustrating a printing effect of an additive manufacturing device according to some embodiments of the present disclosure. FIG. 1B is a schematic diagram illustrating a printing effect of an additive manufacturing device according to some embodiments of the present disclosure. FIG. 1C is a schematic diagram illustrating a printing effect of an additive manufacturing device according to some embodiments of the present disclosure.

In some embodiments, upper three images in FIGS. 1A-1C show three transparent 3D objects (orthodontic dental appliances) printed by additive manufacturing devices with three different scattering films. Lower three images in FIGS. 1A-1C show partial enlargements (e.g., the portion in the boxes) of the transparent 3D objects in the upper three images. As shown in FIGS. 1A-1C, the 3D object in FIG. 1A shows clear surface layer lines. The surface layer lines may be linear textures in FIG. 1A. The 3D objects in FIG. 1B and FIG. 1C show a large number of point-like textures. The point-like textures may be the smallest texture units in FIG. 1B and FIG. 1C. A point-like texture may be formed by irradiating and curing one pixel. By comparison, the transparency of the 3D object in FIG. 1A may be much higher than the transparency of the 3D objects in FIG. 1B and FIG. 1C. Therefore, the transparency of the printed 3D object may be related to the texture pattern on the surface of the printed 3D object. The more blurred the boundary of the texture pattern on the surface of the printed 3D object is, the higher the transparency of the printed 3D object is, for example, the surface layer lines in FIG. 1A. The clearer the boundary of the texture pattern on the surface of the printed 3D object is, the lower the transparency of the printed 3D object is, for example, the point-like textures in FIG. 1B and FIG. 1C.

The reason for the above-mentioned phenomenon is that the light image formed by the light source on the building surface is composed of a plurality of pixels, the light intensity in a single pixel may vary with the inner-pixel location, the light intensity is weak in an edge region of the pixel, and the light intensity is strong in a center region of the pixel. In the region with strong light intensity, the light is easy to transmit through the photocurable resins of the current cured layer to the previous cured layer, thereby resulting in undesired curing, so that the cured layer in the region is more protruded, while the cured layer corresponding to the region with weak light intensity is more depressed. This situation may cause an uneven surface of the printed 3D object in a direction perpendicular to the photocuring building surface, thereby resulting in a reduction of resolution and a low transparency of the printed 3D object, for example, the point-like textures in FIG. 1B and FIG. 1C.

Figure 2:
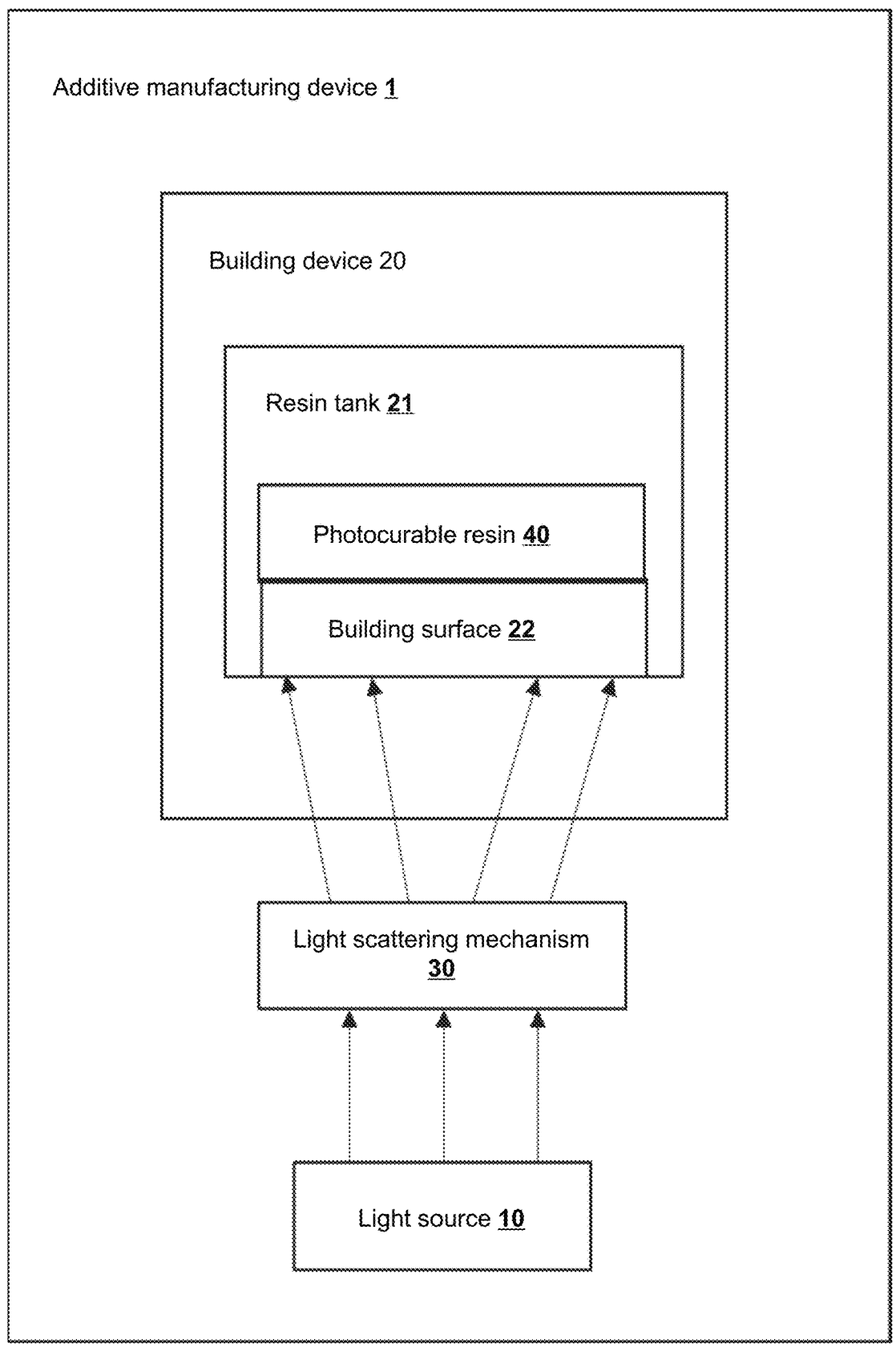
FIG. 2 is a block diagram illustrating a structure of an additive manufacturing device according to some embodiments of the present disclosure.

FIG. 2 is a block diagram illustrating a structure of an additive manufacturing device according to some embodiments of the present disclosure.

As shown in FIG. 2, the embodiments of the present disclosure provide an additive manufacturing device 1. The additive manufacturing device 1 may include a light source 10, a building device 20, and a light scattering member 30. The light source 10 may be configured to provide light to cure photocurable resins 40. The building device 20 may include a resin tank 21 configured to store the photocurable resins 40. The building device 20 may have a building surface 22. The building surface 22 may refer to a surface on which the photocurable resins 40 are irradiated and cured. The light scattering member 30 may be arranged between the light source 10 and the building surface 22. The light scattering member 30 may be configured to alter a light propagation direction of the light from the light source 10 to cause an inner-pixel light intensity change on the building surface 22. The light of the light source 10 may form a light image on the building surface. The light image may include a plurality of pixels. The pixels may be smallest units of the light image on the building surface 22. A plurality of pixels on the building surface 22 may constitute the light image consistent with a printed pattern of the current cured layer. The light propagation direction of the light source 10 may be altered to cause an inner-pixel light intensity change on the building surface 22. It can be understood that a light propagation direction of the light source 10 before passing through the light scattering member 30 and a light propagation direction of the light source 10 after passing through the light scattering member 30 may not be collinear, and after passing through the light scattering member 30, a deviation range of the light may still be limited to the pixels on the building surface 22. In other words, for the light corresponding to a single pixel, although being altered after passing through the light scattering member 30, the light of the light source 10 may still be projected within a region on the building surface 22 where the pixels of the light image formed when the light of the light source 10 does not pass through the light scattering member 30 are located.

In some embodiments, the photocuring resin may include radical photocurable resins and cationic photocurable resins. Examples of the radical photocurable resins may include, but not limited to, acrylic resins, methacrylic resins, N-vinylpyrrolidone, acrylamides, styrenes, olefins, halogenated olefins, cyclic olefins, maleic anhydride, alkenes, alkynes, carbon monoxide, functionalized oligomers (e.g., epoxides, polyurethanes, polyethers, or polyesters functionalized with acrylate or methacrylate groups, etc.), functionalized polyethylene glycol (PEG), etc. Examples of the cationic photocurable resins may include, but not limited to, epoxy groups and vinyl ether groups. Merely by way of example, the cationic photocurable resins may include, but are not limited to, styrene compounds, vinyl ethers, N-vinyl carbazoles, lactones, Lactams, cyclic ethers (such as epoxides), cyclic acetals and cyclic siloxanes, etc.

In some embodiments, the photocurable resins 40 may include one or more radical photocurable resins, one or more cationic photocurable resins, or a combination thereof.

In some embodiments, the photocurable resins 40 may be a dual-cure resin. In some embodiments, the dual-cure resin may undergo a first photocuring process under the irradiation of the light source 10 to form an intermediate print. The printing intermediate may have a desired shape and structure of the 3D object, but may be inferior in mechanical strength. The intermediate print may undergo a second curing process to form the final 3D object. The second curing process may be carried out by heating, microwave radiation, and humidity (i.e., exposing the printed object to water vapor at elevated or ambient temperature). After the second curing process, the printed object with substantially the same shape and structure as the desired 3D object may be obtained, while the mechanical strength of the printed object may be improved.

In some embodiments, the photocurable resins 40 may further include a photoinitiator. The photoinitiator may be any suitable photoinitiator capable of initiating a photocuring reaction with the light source 10 in the embodiments of the present disclosure. In some embodiments, an absorption wavelength of the photoinitiator may be within a range of 350 nm-420 nm. In some embodiments, a wavelength at which the light source 10 initiates the photocuring process may be 405 nm. In other embodiments, a wavelength at which the light source 10 initiates the photocuring process may be 385 nm. In some embodiments, examples of the photoinitiator may include, but are not limited to,

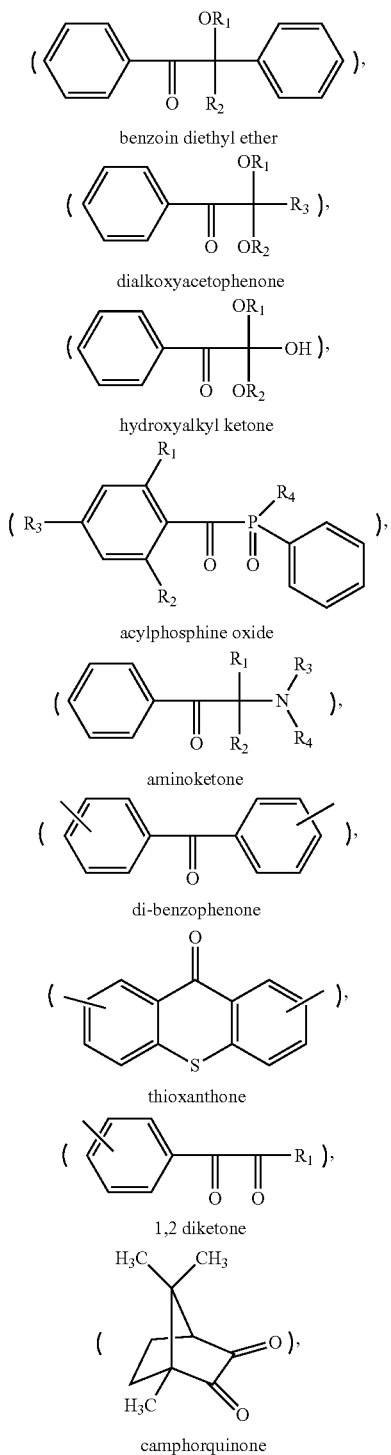

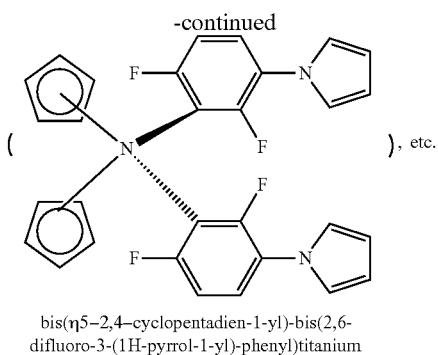

bis(η5-2,4-cyclopentadien-1-yl)-bis(2,6-difluoro-3-(1H-pyrrol-1-yl)-phenyl)titanium Rn in the chemical formulas may be any number of other atoms including hydrogen (H), oxygen (O), carbon (C), nitrogen (N), sulfur (S).

In some embodiments, the photoinitiator may be benzoylphosphine oxide including but not limited to

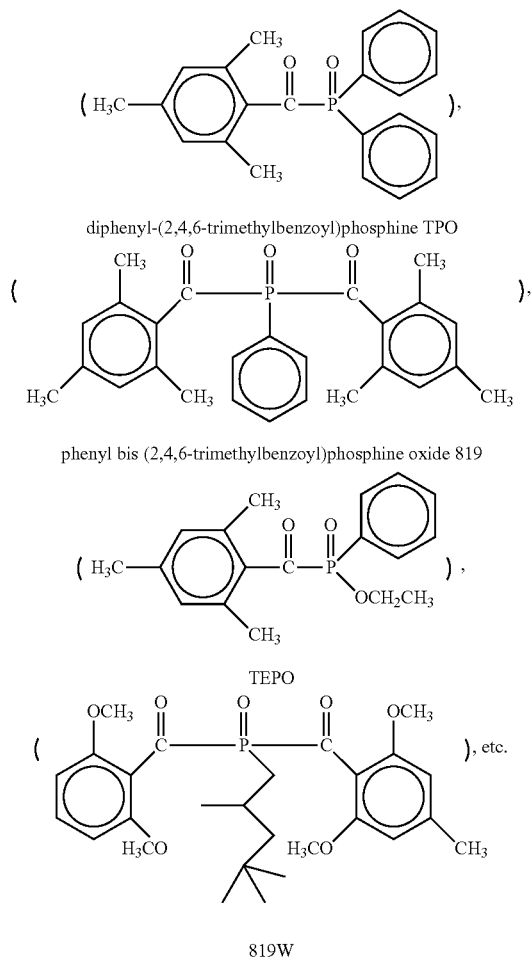

diphenyl-(2,4,6-trimethylbenzoyl)phosphine TPO phenyl bis (2,4,6-trimethylbenzoyl)phosphine oxide 819

TEPO

819W

In some embodiments, the light source 10 may be arranged above the building device 20 to irradiate the photocurable resins 40 in the resin tank 21 from above. In such cases, the building surface 22 may be located at an upper liquid level of the photocurable resins 40. In some embodiments, the light source 10 may be arranged below the building device 20 to irradiate the photocurable resins 40 in the resin tank 21 from below. In such cases, the building surface 22 may be located at a lower liquid level of the photocurable resins 40.

In some embodiments, the light scattering member 30 may be arranged between the building surface 22 and the light source 10, so that the light emitted from the light source 10 is scattered onto the building surface 22 through the light scattering member 30. For example, after entering the light scattering member 30, a light path of the light emitted from the light source may shift in the light scattering member 30, so that the light path diffuses to the surroundings according to a certain angle. After leaving the light scattering member 30, the diffused light may be projected onto the building surface 22 according to the diffused angle. In some embodiments, the light scattering member 30 may include, but not limited to, a light uniforming device, a light source profile modifier, a light source shifter, a scattering layer, or the like. More descriptions regarding the light scattering member 30 may be found elsewhere in the present disclosure.

In some embodiments, a first transparency T1 of a first print may be formed by curing the photocurable resins on the building surface by the light emitted from the light source that passes through the light scattering member. A second transparency T2 of a second print may be formed by curing the photocurable resins on the building surface by the light emitted from the light source that does not pass through the light scattering member. The first transparency T1 may be greater than the second transparency T2. The first print and the second print may refer to transparent 3D objects printed by the additive manufacturing device 1.

Based on the structure of the additive manufacturing device 1, the light image formed by the light source on the building surface 22 may be composed of a plurality of pixels, and the light intensity in a single pixel may vary with the inner-pixel location. The light intensity may be weak in the edge region of the pixel, and the light intensity may be strong in the center region of the pixel. After the light emitted from the light source is scattered by the light scattering member, due to the change of the angle of the light propagation direction, the light intensity in the edge region of the pixel may be enhanced and the light intensity in the center region of the pixel may be weakened, so that a boundary between the pixels may be blurred, thereby reducing the protrusions and the depressions on the surface of the printed 3D object and improving the transparency of the printed 3D object.

Figure 3:
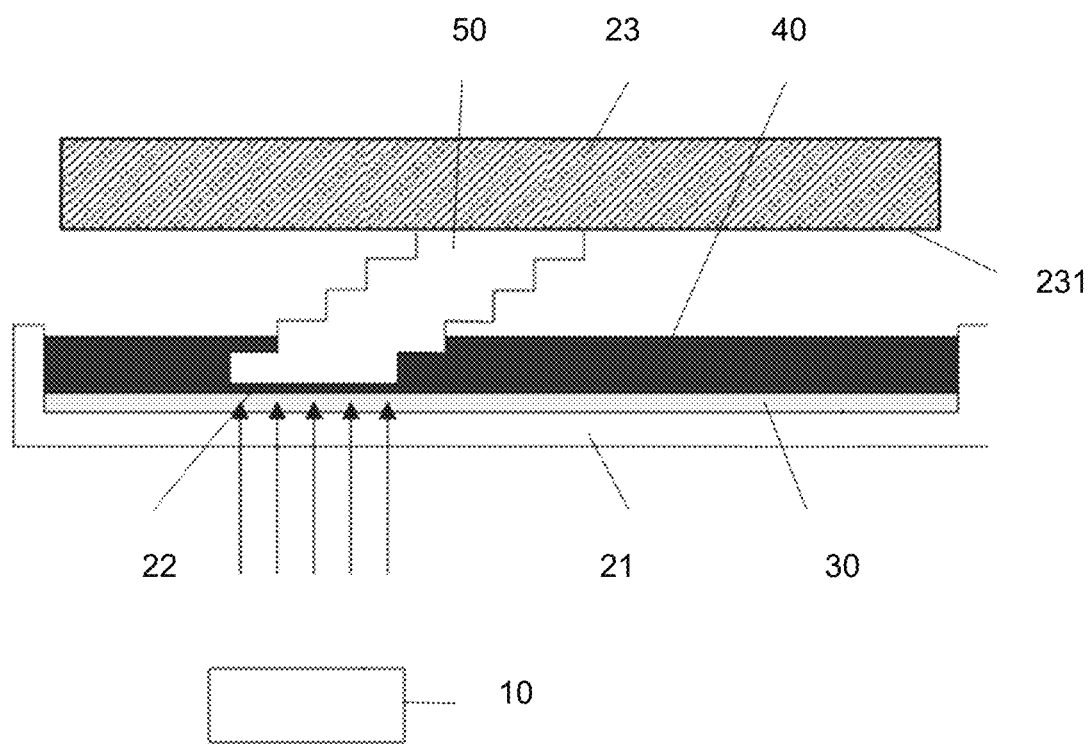
FIG. 3 is a schematic diagram illustrating a structure of an additive manufacturing device according to some embodiments of the present disclosure.

FIG. 3 is a schematic diagram illustrating a structure of an additive manufacturing device according to some embodiments of the present disclosure.

In some embodiments, FIG. 3 illustrates an example in which the additive manufacturing device 1 manufactures a 3D object 50 by down-top layer-by-layer stacking. A light source 10 may be arranged below a building device 20. Liquid photocurable resins 40 may be stored in a resin tank 21. The light source 10 may irradiate a bottom of the resin tank 21 from bottom to top to make the photocurable resins at the bottom of the resin tank 21 constitute a cured layer. A current cured layer may be formed on a lower surface of a previous formed cured layer. At least a portion of the bottom of the resin tank 21 may be transparent, and the light may irradiate the photocurable resins 40 through the bottom of the resin tank 21. In some embodiments, the entire bottom of the resin tank 21 may be transparent. In some embodiments, a portion of the bottom of the resin tank 21 may be transparent. In some embodiments, the bottom of the resin tank 21 may be made of transparent glass, transparent resin, transparent plastic, or other materials. In some embodiments, a light transmittance of the bottom of the resin tank 21 may be within a range of 40%-100%. The building surface 22 may refer to an irradiated region of the light that passes through the bottom of the resin tank 21 and irradiates onto the photocurable resins 40. In some embodiments, the light scattering member 30 may be arranged at the bottom of the resin tank 21 and located between the building surface 22 and the light source 10. In other embodiments, the light scattering member 30 may be configured to manufacture a 3D object by stacking layer by top-down layer-by-layer stacking. In such cases, the light source may be arranged above the building device, the liquid photocurable resins may be stored in the resin tank, and the light source may irradiate a top surface of the photocurable resins in the resin tank from top to bottom to form a cured layer. The current cured layer may be formed on an upper surface of the previous formed cured layer. The embodiments of the present disclosure do not limit the application scenarios of the light scattering member 30, which may be used in any form of additive manufacturing device.

In some embodiments, the building device 20 may further include a build platform 23. In some embodiments, the build platform 23 may be a platform for supporting and fixing the cured layers of the photocurable resins 40. The build platform 23 may be provided with a plane 231 capable of fixing the cured layers. The finally printed 3D object 50 may be formed on the plane 231 of the build platform 23. In some embodiments, the build platform 23 may be configured to move in a direction away from the light source 10 to make the cured photocurable resins 40 away from the building surface 22.

In some embodiments, the building device 20 may further include a lifting member (not shown) on which the building platform 23 may be arranged. The lifting member may drive the build platform 23 to move up and down to approach or move away from the light source 10. Before the additive manufacturing device 1 prints the 3D object 50, the lifting member may drive the build platform 23 to be away from or close to the light source 10 to adjust a relative position between the build platform 23 and the building surface 22. When the additive manufacturing device 1 is printing the 3D object 50, the lifting member may drive the build platform 23 to be away from the light source 10 to make the previous cured layer away from the building surface 22, so that the photocurable resins 40 may flow to a surface of the previous cured layer and be irradiated by the light source 10 to form a new building surface 22.

In some embodiments, the building device 20 may further include a controller (not shown). In some embodiments, the controller may be connected to the lifting member to control a moving direction and a moving distance of the lifting member.

In some embodiments, the controller may control the lifting member to drive the build platform 23 to move toward a direction away from the light source 10 successively at a preset interval, so that the previous cured layer may be separated from the building surface 22, thereby realizing layer-by-layer printing of the photocurable resins 40. For example, after a cured layer is formed on the build platform 23, the lifting member may drive the build platform 23 to move a preset distance away from the light source 10 to cause the previous cured layer to be separated from the building surface 22, accordingly, the liquid photocurable resins 40 may flow between the previous cured layer and the building surface 22 and be irradiated by the light source 10 to form a new cured layer.

In some embodiments, the additive manufacturing device may be configured to manufacture orthodontic dental appliances, bone scaffolds, heart valves, intravascular stents, and cartilage tissues, which is not limited in the present disclosure. In other embodiments, the additive manufacturing device may further be configured to manufacture shoe soles, insoles, pillows, desktop ornaments, models, mechanical parts, plastic toys, sand table models, or the like.

In some embodiments, the light source 10 may be a surface light source. The surface light source may refer to a light source whose output beams may form a surface image on the building surface 22. The surface light source may have a plurality of pixels on the building surface 22. A pixel may be a smallest unit of a light image on the building surface.

In some embodiments, the light source 10 may be an LCD light source. In some embodiments, the LCD light source may emit light beams through a series of LCD light sources through a liquid crystal display.

In some embodiments, the light source 10 may be a light source of a digital light processing projection device. In some embodiments, the light source of the digital light processing projection device may emit light beams after being digitally processed by the digital light processing projection device.

In some embodiments, the LCD light source and/or the light source of the digital light processing projection device may include but not be limited to ultraviolet laser, LED light, or a high-pressure pump lamp. In some embodiments, a wavelength of the ultraviolet laser may be 355 nm, which may be better absorbed by the photocurable resins 40 and have minimal damage to the photocurable resins 40 than other wavelengths. The wavelength of the ultraviolet laser may be short, and an action time on the photocurable resins 40 may be short, which may minimize the time of thermal effect and protect the photocurable resins 40.

In some embodiments, the light intensity in a single pixel may vary with the inner-pixel location. For example, the light intensity of an edge region of a single pixel may be less than the light intensity of a center region of the pixel. In the photocuring process, a degree of photocuring caused by irradiating the region with higher light intensity on the photocurable resins 40 may be high, and a degree of photocuring caused by irradiating the region with lower light intensity on the photocurable resins 40 may be low. Therefore, the region with higher light intensity may be relatively protruded, and the region with lower light intensity may be relatively depressed, so that the entire surface of the 3D object 50 is uneven. The more uneven the surface is, the lower the transparency of the 3D object 50 is.

Figure 4:
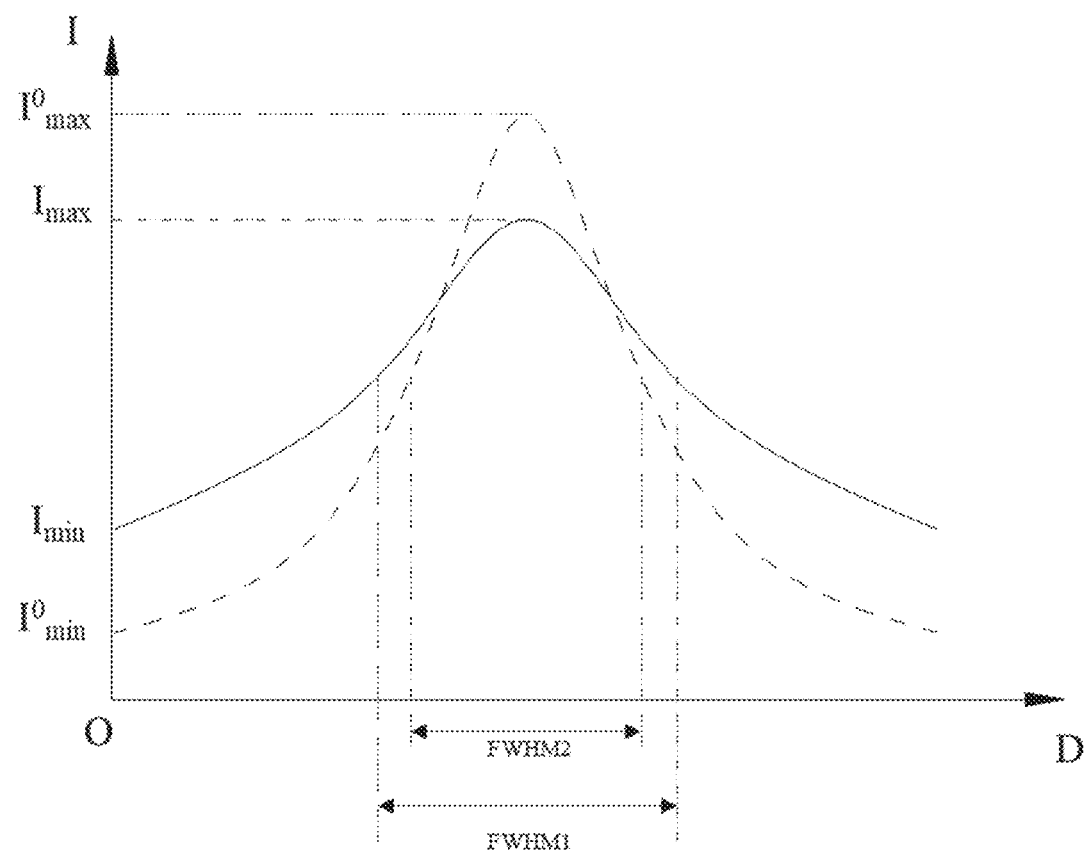
FIG. 4 is a schematic diagram illustrating Gaussian distribution curves of light intensity within a single pixel corresponding to a light source passing through a light scattering member and not passing through the light scattering member according to some embodiments of the present disclosure.

FIG. 4 is a schematic diagram illustrating Gaussian distribution curves of light intensity within a single pixel corresponding to a light source passing through a light scattering member and not passing through the light scattering member according to some embodiments of the present disclosure. A dotted line in FIG. 4 may represent the Gaussian distribution curve of light intensity in the single pixel corresponding to the light source that does not pass through the light scattering member according to some embodiments. A solid line in FIG. 4 may represent the Gaussian distribution curve of light intensity in the single pixel corresponding to the light source that passes through the light scattering member according to some embodiments.

In some embodiments, a first ratio A1 may be a ratio of a maximum value $I_{max}$ to a minimum value $I_{min}$ of a light intensity I, in a single pixel on the building surface, wherein the single pixel is formed by the light that passes through the light scattering member. A second ratio A2 may be a ratio of a maximum value $I^0_{max}$ to a minimum value $I^0_{min}$ of a light intensity $I^0$, in a single pixel on the building surface, wherein the single pixel is formed by the light that does not pass through the light scattering member. The first ratio A1 of at least one pixel may be less than the corresponding second ratio A2. As used herein, the "corresponding" may refer to that the first ratio A1 and the second ratio A2 of the same pixel are compared. In other words, after the light scattering member is used, the ratio of the maximum value $I_{max}$ to the minimum value $I_{min}$ of the light intensity I in a single pixel of a light image formed by the light source on the building surface reduces, thereby reducing a difference of the light intensities between different positions in the pixel, and accordingly, improving the surface smoothness and the transparency or clarity of the printed 3D object. It should be noted that the maximum value $I_{max}$ and minimum value $I_{min}$ of the light intensity I may be both for the light of one single pixel.

In some embodiments, a first full-width at half of maximum (FWHM1) may be a full-width at half of maximum (FWHM) of a Gaussian distribution curve of a light intensity I, in a single pixel on the building surface, wherein the single pixel is formed by the light that passes through the light scattering member. A second full-width at half of maximum (FWHM2) is an FWHM of a Gaussian distribution curve of a light intensity, in a single pixel on the building surface, wherein the single pixel is formed by the light that does not pass through the light scattering member. The FWHM1 of at least one pixel may be greater than the corresponding FWHM2. As used herein, the "corresponding" may refer to that the first FWHM1 and the second FWHM2 of the same pixel are compared. In other words, after the light scattering member is used, the FWHM1 of the Gaussian distribution curve of the light intensity I, in a single pixel on the building surface, of the light emitted from the light source increases. A Gaussian distribution curve of the light intensity of a pixel on the building surface may be formed by taking any point on the boundary of the pixel as a coordinate origin O, a straight line passing through the coordinate origin O and a center point of the pixel as an abscissa D, and the light intensity as an ordinate I. That is, the Gaussian distribution curve is a curve that indicates the variation of light intensity with the inner-pixel location. The pixel on the building surface may include, but is not limited to, a figure such as a circle, a rectangle, a triangle, an ellipse, or other irregular figures. The center point of the pixel may include, but is not limited to, a geometric symmetry center of the pixel, a center of gravity of the pixel, an intersection of a longest axis and a shortest axis of the pixel, etc. According to the Gaussian distribution curve of the light intensity of the pixel on the building surface, the FWHM may be a width, along the abscissa, of a peak of light intensity corresponding to a half height of the peak of light intensity. The larger the FWHM is, the smoother the Gaussian distribution curve is, the smaller a difference of light intensities corresponding to different inner-pixel locations is, and the higher the transparency of the printed 3D object is.

In some embodiments, a coordinate system may be established, an abscissa of the coordinate system may represent a location (e.g., a location of the building surface), and an ordinate of the coordinate system may represent the light intensity. In some embodiments, the light intensity in the single pixel formed on the building surface may vary in a waveform with the inner-pixel location. A part with relatively strong light intensity may correspond to a crest, and a part with relatively weak light intensity may correspond to a trough. The smaller a difference between the crest and the trough is, the more continuous the light source is, and the higher the transparency of the printed 3D object is. In some embodiments, the light intensity corresponding to the trough may be increased by controlling the scattering of light, thereby reducing the difference between the crest and the trough.

In some embodiments, the light scattering member may include a light uniforming device. The light uniforming device may be configured to adjust a distribution of inner pixel light intensity of a light source. It can be understood that adjusting the distribution, in a plurality of pixels, of the inner pixel light intensity of the light source by the light uniforming device is equivalent to adjusting the distribution, in each pixel, of the inner pixel light intensity by the light uniforming device. In some embodiments, the light uniforming device may apply to various light sources, including but not limited to a liquid crystal display light source or a light source of a digital light processing projection device. In some embodiments, the light uniforming device may be arranged in a light propagation path between the light source and the building surface. The light uniforming device scatters light to reduce a difference between a light intensity in an edge region of each pixel and a light intensity in a center region of the pixel, thereby blurring boundaries between pixels and increasing the transparency and clarity of the printed 3D object.

In some embodiments, when a size of a single pixel is X μm, a size of an output beam of the light uniforming device may be within a range of X–5×X μm. The size of the pixel may include a side length, a diameter, or the like, of the pixel. In some embodiments, the output beam may be represented by a waveform curve that indicates the variation of light intensity with the inner-pixel location. In other embodiments, the output beam may be represented by a shape such as a circle or an ellipse on the building surface.

In some embodiments, a distance between the light uniforming device and the building surface may be greater than a distance between the light uniforming device and the light source. In some embodiments, the distance between the light uniforming device and the building surface may be equal to the distance between the light uniforming device and the light source. In some embodiments, the distance between the light uniforming device and the building surface may be less than the distance between the light uniforming device and the light source to improve the scattering accuracy of the output beam by the light uniforming device, thereby improving the transparency of the printed 3D object.

In some embodiments, the light uniforming device may include, but not limited to a light source profile modifier, a light source shifter, a light uniforming sheet, a glass structure, an optical element, or the like, or any combination thereof, which is not limited in the present disclosure. More descriptions regarding the light source profile modifier, the light source shifter, the light uniforming sheet, the glass structure, or the optical element may be found elsewhere in the present disclosure.

In some embodiments, the light uniforming device may include an optical element capable of changing a distribution of the output beam and achieving a predetermined radiation pattern. In some embodiments, when a light source used to achieve photocuring is an array, such as a light source array of a DLP device or a micro light emitting diode (microLED) light source array, the optical element may scatter the passing light by changing a single output beam. A plurality of optical elements may constitute a light scatterer array.

Merely by way of example, when the microLED array is used in the additive manufacturing device, scattered light may be generated by the light scatterer array. The light scatterer array may be arranged at a position corresponding to the microLED array, so that each optical element may perform light scattering on a light beam corresponding to each pixel, i.e., the light emitted by each microLED array may be scattered by a corresponding optical element in the light scatterer array.

In some embodiments, the light uniforming device may include a light source profile modifier arranged on a light path of the light source and configured to modify profiles of the one or more pixels of the light source. The boundaries of the pixels may be blurred through the light source profile modifier, thereby increasing the transparency of the printed 3D object.

In some embodiments, the light source profile modifier may be applied to an LCD light source and configured to modify a light profile, in a single pixel on the building surface, of the LCD light source. In some embodiments, the light source profile modifier may be an optical element that is manufactured by additive manufacturing. The transparent light source profile modifier may be printed layer by layer through the additive manufacturing device. In some embodiments, the accuracy of additive manufacturing may reach a micron level (e.g., the accuracy of the additive manufacturing device may reach 50 microns). A micron-level profile modifier may be printed through additive manufacturing. The printed light source profile modified may be used for the LCD light source, which may achieve light scattering at the micron level, thereby achieving profile modification in a single pixel.

In some embodiments, when a size of a pixel is X μm, a size of an output beam of the light source profile modifier may be within a range of X–5×X μm. The size of the pixel may include a side length, a diameter, or the like, of the pixel. In some embodiments, the output beam may be represented by a waveform curve that indicates the variation of light intensity with the inner-pixel location. In other embodiments, the output beam may be represented by a shape such as a circle or an ellipse on the building surface.

In some embodiments, the light source may be a liquid crystal display light source. In some embodiments, the light source profile modifier may be applied to stereolithography using a laser light (SLA).

In some embodiments, the light uniforming device may include a light source shifter. The light source shifter may shift to increase pixels on the building surface, thereby blurring the boundaries of the pixels and improving the transparency of the printed 3D object.

In some embodiments, the light source shifter may be suitable for shifting a light source of a digital light processing projection device. Merely by way of example, the light source shifter may be configured to shift a display chip of the digital light processing projection device to shift the output beam, so that the output beam moves rapidly clockwise or counterclockwise between adjacent pixels, thereby blurring the boundaries of the pixels, and improving the transparency of the printed 3D object.

In some embodiments, the light uniforming device may include a light uniforming sheet. In some embodiments, the light uniforming sheet may implement scattering and light uniforming of the light beam through micro-lenses with regular or irregular surfaces. In some embodiments, a shape profile, a divergence angle, and a distribution of inner pixel light intensity of the light source may be adjusted by changing sizes and shapes of the micro-lenses on the surface of the light uniforming sheet.

In some embodiments, the light uniforming device may include a glass structure. The glass structure may include frosted glass, sandblasted glass, or etched glass. In some embodiments, the glass structure may be arranged on an inner surface of a bottom of a resin tank, and in direct contact with photocurable resins. In some embodiments, the glass structure may be arranged on an outer surface of the bottom of the resin tank. In some embodiments, the glass structure may be integrated with the bottom of the resin tank, i.e., the bottom of the resin tank may be made of glass, which is frosted, sandblasted, or etched to form a scattering layer.

In some embodiments, when a size of a pixel is X μm, a surface roughness Ra of the glass structure may be X–5×X μm. The size of the pixel may include a side length, a diameter, or the like, of the pixel. The surface roughness Ra may indicate microscopic unevenness of tiny peaks and valleys on the surface of the glass structure. A degree to which the glass structure scatters the light may be controlled by controlling the surface roughness. The glass structure with the surface roughness Ra within the range of X–5×X μm may blur the boundaries of the pixels and improve the transparency of the printed 3D object.

In some embodiments, the light scattering member may include a transparent scattering layer. The scattering layer may be a film structure capable of scattering passing light beams. In some embodiments, the scattering layer may be arranged in a light propagation path between the light source and the building surface, to make the light emitted by the light source pass through the scattering layer to be scattered and then radiate onto the building surface. In some embodiments, the scattering layer may be a polymer film. In some embodiments, the scattering layer may be arranged on the building surface, and the output beam of the light source may be scattered onto the building surface through the scattering layer. In some embodiments, the scattering layer may constitute the building surface, and the photocurable resins may be cured and formed on a side of the scattering layer away from the light source. By setting the scattering layer, the boundaries of the pixels on the building surface may be blurred, thereby improving the transparency and clarity of the printed 3D object.

In some embodiments, when a size of a pixel is X μm, a size of a light beam passing through the scattering layer may be within a range of X–5×X μm. The size of the pixel may include a side length, a diameter, or the like, of the pixel.

In some embodiments, the scattering layer may be at least a portion of a bottom surface of the resin tank, i.e., the scattering layer and the bottom surface of the resin tank may be integrated. Merely by way of example, the entire bottom surface of the resin tank may be the scattering layer, or a partial region of the bottom surface of the resin tank may be the scattering layer.

In some embodiments, the scattering layer may be an independent structure. In some embodiments, the scattering layer may be arranged on an inner surface of the bottom of the resin tank, or, the scattering layer may be arranged on an outer surface of the bottom of the resin tank. In some embodiments, the scattering layer may be spaced apart from the resin tank.

In some embodiments, a refractive index of the scattering layer may be different from a refractive index of a surrounding object (e.g., air, the bottom of the resin tank, etc.). When entering the scattering layer, the output beam may be refracted on the scattering layer, to cause the light beam to be scattered in different directions. In some embodiments, the scattering layer may include a paper layer, and an anti-adhesion coating may be arranged between the scattering layer and the photocurable resins, to prevent the photocurable resins from entering the paper layer, and help to separate the cured layer from the paper layer.

In some embodiments, a transparency of the scattering layer may be within a range of 40%-100%. For example, the transparency of the scattering layer may be 50%, 60%, 70%, 80%, 90%, 95%, etc.

In some embodiments, the scattering layer may be made of a flexible material and/or an elastic material. In some embodiments, the scattering layer may be made of natural rubber, synthetic rubber, polytetrafluoroethylene, polyurethane, polybutadiene, polyisobutylene, neoprene, silicon resin, polyperfluoroethylene propylene, ethylene-chlorotrifluoroethylene copolymer, polyvinylidene fluoride, ethylene-tetrafluoroethylene copolymer, tetrafluoroethylene-vinylidene fluoride copolymer, chlorotrifluoroethylene-vinylidene fluoride copolymer, o-phenylphenol, polyterephthalic acid, polyisoprene, polyacrylic rubber, fluorosilicone rubber, fluororubber, methyl chlorosilane, ethyl chlorosilane, phenyl chlorosilane, polytrifluorochloroethylene, polytetrafluoroethylene, polyvinylidene fluoride, polyvinyl fluoride, polytrichloroethylene, perfluoroalkyl polyether, hexafluoropropylene, fluorinated polyvinyl chloride, poly(4-methyl-1-pentene), or polydimethylsiloxane (PDMS), or the like, or any derivative thereof. These materials may not only meet the transparency requirements of the scattering layer, but also have a certain elastic deformation ability to make these materials more easily fit to a surrounding structure (e.g., the bottom surface of the resin tank).

In some embodiments, an elastic modulus of the scattering layer may be within a range of 1-50 MPa. The elastic modulus may reflect a deformation ability of the scattering layer. If the elastic modulus is too small, the scattering layer may be more likely to be deformed by an external force, so that it is difficult to maintain the shape of the scattering layer, thereby affecting a scattering rate. If the elastic modulus is too large, the scattering layer may be more difficult to deform by an external force, and accordingly, the scattering layer is too rigid to fit the surrounding structure completely, thereby affecting the scattering rate. Therefore, the elastic modulus of 1-50 MPa may not only meet a strength of the scattering layer, but also make the scattering layer fit closely to the surrounding structure, thereby improving the accuracy of light beam scattering.

In some embodiments, a tensile strength of the scattering layer may be within a range of 5-50 MPa. The tensile strength may represent resistance of a material to maximum uniform plastic deformation. The scattering layer with the tensile strength of 5-50 MPa not only has a certain tensile strength, but also has a certain deformation ability.

In some embodiments, an elongation at break of the scattering layer may be within a range of 50%-800%. The elongation at break may refer to a ratio of a displacement value of the scattering layer when the scattering layer is broken to an original length of the scattering layer. The scattering layer with the elongation at break of 50%-800% may not be easy to break under an external force.

In some embodiments, the scattering layer may include a substrate and a microstructure arranged on the substrate. In some embodiments, the substrate may have a layered structure. The microstructure may be made of different materials from the scattering layer to form an interface between the microstructure and the substrate. The interface may enhance the scattering effect of light, thereby improving the transparency of the printed 3D object. In some embodiments, the microstructure may be arranged inside the substrate. In some embodiments, the microstructure may also be arranged on an outer surface of the substrate. For example, the microstructure arranged on the outer surface of the substrate may be in contact with air. As another example, the microstructure arranged on the outer surface of the substrate may be in contact with the photocurable resins. As yet another example, the microstructure arranged on the outer surface of the substrate may be in contact with the bottom surface of the resin tank. In some embodiments, a feature size of the microstructure may be within a range of 10 nm-20 μm. The feature size may refer to a smallest size among isotropic sizes of the microstructure.

In some embodiments, the microstructure may include, but is not limited to, at least one of surface textures, micropores, fiber structures, or nano-particles. More descriptions regarding the surface textures, the micropores, the fiber structures, or the nano-particles may be found elsewhere in the present disclosure In some embodiments, the microstructure may include the surface textures. In some embodiments, the surface textures may include surface protrusions or depressions arranged in an array. For example, the surface textures may include a plurality of protrusions located on a surface of the scattering layer. Shapes of the protrusions may include, but are not limited to, a hemispherical shape, a cylindrical shape, a conical shape, a pyramidal shape, or the like. As another example, the surface textures may include depressions located on the surface of the scattering layer. Shapes of the depressions may include, but are not limited to, a hemispherical shape, a cylindrical shape, a conical shape, a pyramidal shape, or the like.

In some embodiments, the surface textures may include, but are not limited to, continuous textures such as wavy, jagged, or "Z-shaped" textures.

In some embodiments, a feature size of the surface textures may be within a range of 10 nm-20 μm. The feature size may refer to a smallest size among isotropic sizes of the surface textures.

In some embodiments, the micropores may include closed pores formed inside the substrate. In some embodiments, the micropores may include half-open holes formed on the surface of the substrate. The half-open holes may also be regarded as the depressions in the above embodiments. In some embodiments, the micropores may be located at any one or more positions of an interior of the substrate, a side surface of the substrate, an upper surface of the substrate, or a lower surface of the substrate. In some embodiments, the substrate may include a plurality of pores in the interior of the substrate and on an outer surface of the substrate. The plurality of pores may constitute solid-gas interfaces or solid-liquid interfaces, thereby enhancing the scattering of the substrate. In some embodiments, a diameter of the micropores may be within a range of 2 nm-20 μm.

In some embodiments, the substrate may be homogeneous, and a pore size of the micropores across the cross-section of the substrate may be the same. In some embodiments, the substrate may be heterogeneous. In some embodiments, methods for manufacturing a porous scattering layer may include, but not limited to, immersion and precipitation (examples of precipitation may include, but not limited to, thermal precipitation, precipitation by solvent evaporation, vapor phase precipitation, etc.), sintering processes, stretching techniques, trace etching, formwork leaching, sliding casting, sol-gel processes, etc.

In some embodiments, the substrate may include a substrate layer. The fiber structures may be deposited inside the substrate layer. The fiber structures may constitute solid-solid interfaces in the substrate layer to increase the scattering effect of the scattering layer. In some embodiments, there may be a plurality of fiber structures.

In some embodiments, a difference between a refractive index of the substrate layer and a refractive index of the fiber structures may be less than a refractive index of the fiber structures by 20%. In some embodiments, the difference between the refractive index of the substrate layer and the refractive index of the fiber structures may be less than the refractive index of the substrate layer by 20%. The refractive index may be defined as a ratio of a speed of light to a speed of light in a measured material (the substrate layer or the fiber structures).

In some embodiments, a ratio of a total volume of the fiber structures to a volume of the scattering layer may be within a range of 5%-90%. In some embodiments, a ratio of a total weight of the fiber structures to a weight of the scattering layer may be within a range of 5%-90%. It can be understood that there may be a plurality of fiber structures, the total volume of the fiber structures may be understood as a sum of the volumes of all the fiber structures, and the total weight of the fiber structures may be understood as a sum of the weights of all the fiber structures. The volume of the scattering layer may include a volume of the substrate layer and a volume of the fiber structures. The weight of the scattering layer may include a weight of the substrate layer and a weight of the fiber structures. The amount of the fiber structures added to the scattering layer may be controlled by controlling a proportion of the total volume and the total weight of the fiber structure in the scattering layer, so as to prevent too small or too many fiber structures that cannot increase the scattering effect.

In some embodiments, an average value of maximum distances each of which is between two adjacent fiber structures may be within a range of 0.05 μm-50 μm. In some embodiments, the fiber structures may be in a form of fine filaments, which may extend in any curved attitude in the scattering layer. In some embodiments, there may be a maximum distance between any two adjacent fiber structures. The maximum distances between all the adjacent fiber structures may be averaged, and the average value may be within the range of 0.05 μm-50 μm, thereby controlling a dispersion uniformity of the fiber structures in the substrate layer to make the fiber structures more uniformly dispersed in the substrate layer.

In some embodiments, an average length of the fiber structures may be within a range of 0.1-30 mm. If the fiber structures are too short, it may be difficult to increase the light scattering effect. If the fiber structures are too long, the fiber structures may be easy to curl and accumulate in the substrate layer. Therefore, the fiber structures with the average length of 0.1-30 mm may be deposited in the substrate layer in a relatively stretched process.

In some embodiments, some examples of fiber materials deposited in the light uniforming layer may include, but are not limited to, Kevlar™, carbon fiber, polystyrene, polyethylene, ultra-high molecular weight polyethylene, polycarbonate, polyphenylene oxide, poly(methyl methacrylate), parylene (parylene may include parylene C, parylene N, parylene D, parylene HT, and parylene AF), nylon, polycaprolactone, polyamide, polypropylene, perfluoroalkoxy, polymethylpentene, and a derivative polymer thereof.

In some embodiments, the microstructure in the scattering layer may include nano-particles. The nano-particles may constitute solid-solid interfaces in the scattering layer to increase the scattering effect. In some embodiments, there may be a plurality of nano-particles.

In some embodiments, a ratio of a total volume of the nano-particles to a volume of the scattering layer may be within a range of 1%-30%. In some embodiments, a ratio of a total weight of nano-particles to a weight of the scattering layer may be within a range of 1%-30%. It can be understood that there may be a plurality of nano-particles, the total volume of the nano-particles may be understood as a sum of the volumes of all the nano-particles, and the total weight of the nano-particles may be understood as a sum of the weights of all the nano-particles. The volume of the scattering layer may include a volume of the substrate layer and the volume of the nano-particles. The weight of the scattering layer may include the weight of the substrate layer and the weight of the nano-particles. The amount of the nano-particles added to the scattering layer may be controlled by controlling a proportion of the total volume and the total weight of the nano-particles in the scattering layer, so as to prevent too small or too many nano-particles that cannot increase the scattering effect.

In some embodiments, an average value of distances each of which is between two adjacent nano-particles may be within a range of 0.05 μm-50 μm. In some embodiments, the distance between any two adjacent nano-particles may be counted, all the distances between the adjacent nanoparticles may be averaged, and the average value may be within the range of 0.05 μm-50 μm, thereby controlling a dispersion uniformity of the nano-particles in the substrate layer to make the nano-particles more uniformly dispersed in the scattering layer.

In some embodiments, an average particle diameter of the nano-particles may be within a range of 1-100 mm. The nano-particles that are too small or too large may reduce the light scattering effect, and the nano-particles with the average particle diameter of 1-100 mm may better increase the light scattering effect.

In some embodiments, the scattering layer may be a composite layer having a plurality of layers. In some embodiments, when the scattering layer is arranged on the bottom surface of the resin tank, a surface layer of the scattering layer that can be in contact with the photocurable resins may have anti-sticking properties, so that the photocurable resins may be separated from the scattering layer after curing. For example, the surface layer of the scattering layer that can be in contact with the photocurable resins may be made of an elastic material and/or anti-sticking material. In some embodiments, when the scattering layer is arranged on the bottom surface of the resin tank, other layers of the scattering layer that are not in contact with the photocurable resins may be made of materials that can increase the scattering effect, or a microstructure may be added the other layers of the scattering layer that are not in contact with the photocurable resins to increase the scattering effect.

In some embodiments, the composite layer may include a polydimethylsiloxane (PDMS) layer and a paper layer. In some embodiments, the PDMS layer may have certain elasticity and anti-sticking properties. Therefore, the PDMS layer may be set as the surface layer of the scattering layer that can be in contact with the photocurable resins. In some embodiments, the paper layer may be made of a transparent or translucent paper material with light transmission. For example, a light-transmitting paper layer may be made by adding acrylic resin into paper pulp. In some embodiments, a transparency of the paper layer may be within a range of 40%-100%. In some embodiments, the paper layer may be set as the other layers of the scattering layer that is not in contact with the photocurable resins, and a better scattering effect may be achieved through the paper layer.

In some embodiments, the composite layer may include the PDMS layer and a polymer film with a microstructure. In some embodiments, the PDMS layer may have certain elasticity and anti-sticking properties. Therefore, the PDMS layer may be set as the surface layer of the scattering layer that can be in contact with photocurable resins. In some embodiments, a material of the polymer film with a microstructure may be similar to the material of the scattering layer described above, which is not repeated herein. In some embodiments, the microstructure in the polymer film may include, but is not limited to, at least one of surface textures, micropores, fiber structures, or nano-particles. More descriptions regarding the surface textures, the micropores, the fiber structures, or the nano-particles may be found elsewhere in the present disclosure.

In some embodiments, the composite layer may be a release film. The release film may include a plastic layer and an elastic layer. An upper surface of the plastic layer may be used as a photocuring building surface, a material of the upper surface of the plastic layer may be incompatible with the photocurable resins. In some embodiments, the plastic layer of the release film and the photocurable resin material may not wetted each other. Therefore, after the photocurable resins undergoes a curing reaction on the upper surface of the plastic layer to form a cured layer, an adhesion between the cured layer and the plastic layer may be small, which is conducive to the separation of the cured layer and the photocuring building surface. The definition of "not wetted" disclosed in the present disclosure may be that a contact angle of the photocurable resins on the upper surface of the plastic layer may be greater than or equal to 60°. In some embodiments, the contact angle of the photocurable resins on the upper surface of the plastic layer may be greater than or equal to 70°. In some embodiments, the contact angle of the photocurable resins on the upper surface of the plastic layer may be greater than or equal to 80°. In some embodiments, the contact angle of the photocurable resins on the upper surface of the plastic layer may be greater than or equal to 90°.

In some embodiments, a material of the plastic layer may include, but is not limited to, polytetrafluoroethylene (PTFE), polyethylene (PE), polyvinylidene fluoride (PVDF), fluorinated ethylene propylene (FEP), perfluoroalkoxy resin (PFA), polychlorotrifluoroethylene (PCTFE), ethylene-tetrafluoroethylene copolymer (ETFE), polyvinyl fluoride (PVF), polyethylene terephthalate (PET), polybutadiene formaldehyde (PBT), thermoplastic polyurethane (TPU), polyamide (PA) or nylon, polyimide (PI), polypropylene (PP), polyvinyl chloride (PVC), poly Methyl methacrylate (PMMA), polystyrene (PS), polybutylene (PB), polyoxymethylene (POM), polycarbonate (PC), polysulfone (PSU), polyphenylene oxide (PPO), polyvinyl alcohol (PVA), polyacrylonitrile styrene (AS), polyacrylonitrile butadiene styrene (ABS), or fluororesin (FR), or any combination thereof, or any polymer thereof, or any blend polymer thereof, or any block polymer thereof, or any interpenetrating network polymer thereof.

In some embodiments, the elastic layer of the release film may include a reinforcing scaffold and an elastic medium filled in the reinforcing scaffold. In some embodiments, the elastic medium of the elastic layer may be filled in pores of the reinforcing scaffold. A main function of the elastic layer may be to provide an elastic recovery force during a release process. A function of the reinforcing scaffold of the elastic layer may be to improve a mechanical strength of the elastic layer to make the elastic layer serve a longer period of time. The elastic medium of the elastic layer may mainly provide the elastic recovery force during the release process.

In some embodiments, the reinforcing scaffold of the elastic layer may be made of a polymer fiber material, which may have various structures. In some embodiments, the reinforcing scaffold of the elastic layer may have a spider web-like microporous structure, and the micropores may be formed by overlapping polymer microfibers. In some other embodiments, the reinforcing scaffold of the elastic layer may be composed of short polymer fiber materials arranged in order, and the short polymer fibers may be parallel to each other without overlapping. In some other embodiments, the reinforcing scaffold of the elastic layer may be composed of random arrangements of short polymer fiber materials. In some embodiments, a diameter of the polymer fiber material of the reinforcing scaffold of the elastic layer of the composite release film disclosed in the present disclosure may be within a range of 50 nm-10 μm, 100 nm-5 μm, or 200 nm-2 μm.

In some embodiments, the reinforcing scaffold of the elastic layer of the release film may be a porous PTFE film. A surface of the porous PTFE film may have a spider web-like microporous structure, which is formed by the entanglement of a plurality of PTFE microfibers. Pores may be formed between the PTFE microfibers. A diameter of the pores may be within a range of 50 nm-10 μm. In some embodiments, a longitudinal cross-section of the PTFE film may be a network structure. There may be very complex changes, such as network connection, hole nesting, and channel bending in the three dimensions of the micropores. A channel may be composed of a plurality of micropores, and a micropore may be connected to a plurality of channels.

In some embodiments, the reinforcing scaffold of the elastic layer may be in the elastic medium of the elastic layer to form solid-solid interfaces with the elastic medium of the elastic layer, which may scatter light passing through the elastic medium of the elastic layer. Examples of a material of the reinforcing scaffold of the elastic layer may include, but are not limited to, PE, PVDF, FEP, PFA, PCTFE, ETFE, PVF, PET, PBT, TPU, PA or nylon, PI, PP, PVC, PMMA, PS, PB, POM, PC, PSU, PPO, PVA, AS, ABS, or FR, or any combination thereof, or any polymer thereof, or any blend polymer thereof, or any block polymer thereof, or any interpenetrating network polymer thereof. In some embodiments, the material of the reinforcing scaffold of the elastic layer of the release film may be the same as the material of the plastic layer.

In some embodiments, a material of the elastic medium of the elastic layer of the release film may be any suitable elastomer. Examples of the material of the elastic medium of the elastic layer may include, but are not limited to, a polyester elastomer, a propylene-based elastomer, a styrene-based elastomer, an olefin-based elastomer, a diene-based elastomer, a vinylchloride-based elastomer, a lipid-based elastomer, an amide-based elastomer, a silicone polymer, an epoxy polymer, a silicone-based elastomer, a fluorine-based elastomer, or the like.

In some embodiments, the material of the elastic medium of the elastic layer may include, but not limited to silicone, rubber, silicone rubber, thermoplastic vulcanized rubber (TPV), nitrile-butadiene rubber (NBR), butyl rubber, thermoplastic polyurethane (TPU), thermoplastic polyether ester elastomer (TPEE), thermoplastic polyamide elastomer (TPAE), T-NR-trans polyisoprene rubber (TPI), syndiotactic 1,2-polybutadiene (TPB), an organic fluorine thermoplastic elastomer (TPF), thermoplastic phenolic resin (Novalc resin), thermoplastic chlorinated polyethylene (TCPE), methylchlorosilane, ethylchlorosilane, phenylchlorosilane, thermoplastic polyvinyl chloride elastomer (PVC), polydimethylsiloxane (PDMS), polyethylene, polystyrene, polybutadiene, polyurethane, polyisoprene, polyolefin elastomer (POE), ethylene-propylene-diene rubber (EPDM), styrenic thermoplastic rubber (SEBS, SBS), polyether block amide (PEBA), ethylene-vinyl acetate copolymer (EVA, EVM), linear low-density polyethylene (LLDPE), polyacrylic rubber, fluorosilicone rubber, or fluoroelastomer, or any combination thereof, or any polymer thereof, or any blend polymer thereof, or any block polymer thereof, or any interpenetrating network polymer thereof.

In some embodiments, the scattering layer may be a multilayer composite layer including a microstructure. In some embodiments, the microstructure may be deposited on one or more layers of the multilayer composite layer. More descriptions regarding the microstructure may be found elsewhere in the present disclosure.

Figure 5A:
FIG. 5A is a photograph illustrating an exemplary experimental orthodontic dental appliance printed by an additive manufacturing device according to some embodiments of the present disclosure.
Figure 5B:
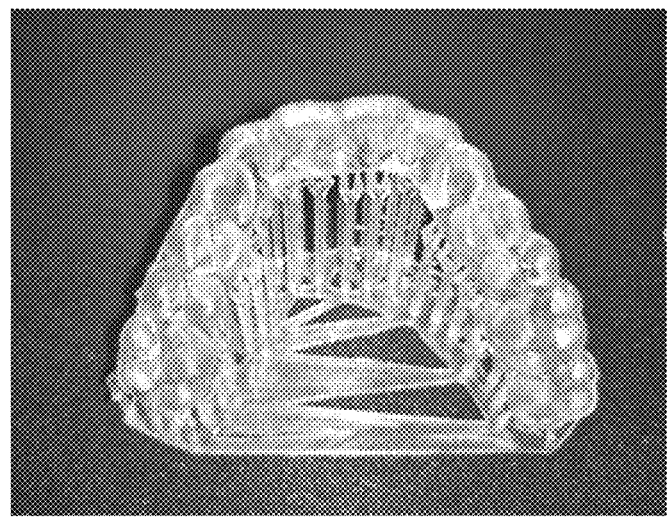
FIG. 5B is a photograph illustrating an exemplary contrast orthodontic dental appliance printed by an additive manufacturing device according to some embodiments of the present disclosure.

FIG. 5A is a photograph illustrating an exemplary experimental orthodontic dental appliance printed by an additive manufacturing device according to some embodiments of the present disclosure. FIG. 5B is a photograph illustrating an exemplary contrast orthodontic dental appliance printed by an additive manufacturing device according to some embodiments of the present disclosure.

The embodiments of the present disclosure provide an exemplary comparison result of orthodontic dental appliance printed by the same printer. FIG. 5A illustrates an experimental orthodontic dental appliance printed by a light scattering member in any embodiments of the present disclosure. FIG. 5B illustrates a contrast orthodontic dental appliance printed by an ordinary FEP film from DuPont Company as a release film (the release film has no light scattering function). Other experimental conditions, experimental equipment, and experimental parameters of printing the experimental orthodontic dental appliance and the contrast orthodontic dental appliance are the same. The experimental parameters are shown in Table 1.

TABLE 1

Parameter table of the printing examples of the additive manufacturing device according to some embodiments of the present disclosure

| | |
|---|---|
| Thickness of printing layer (mm) | 0.1 |
| Light intensity (mw/cm$^2$) | 2.0 |
| Exposure duration (ms) | 2400 |
| Printing temperature (° C.) | 40 |

As shown in the figure, the experimental orthodontic dental appliance in FIG. 5A is significantly more transparent and clearer than the contrast orthodontic dental appliance in FIG. 5B. Therefore, the light scattering member in any embodiments of the present disclosure has the effect of improving the transparency of the printed 3D object.

Figure 6:
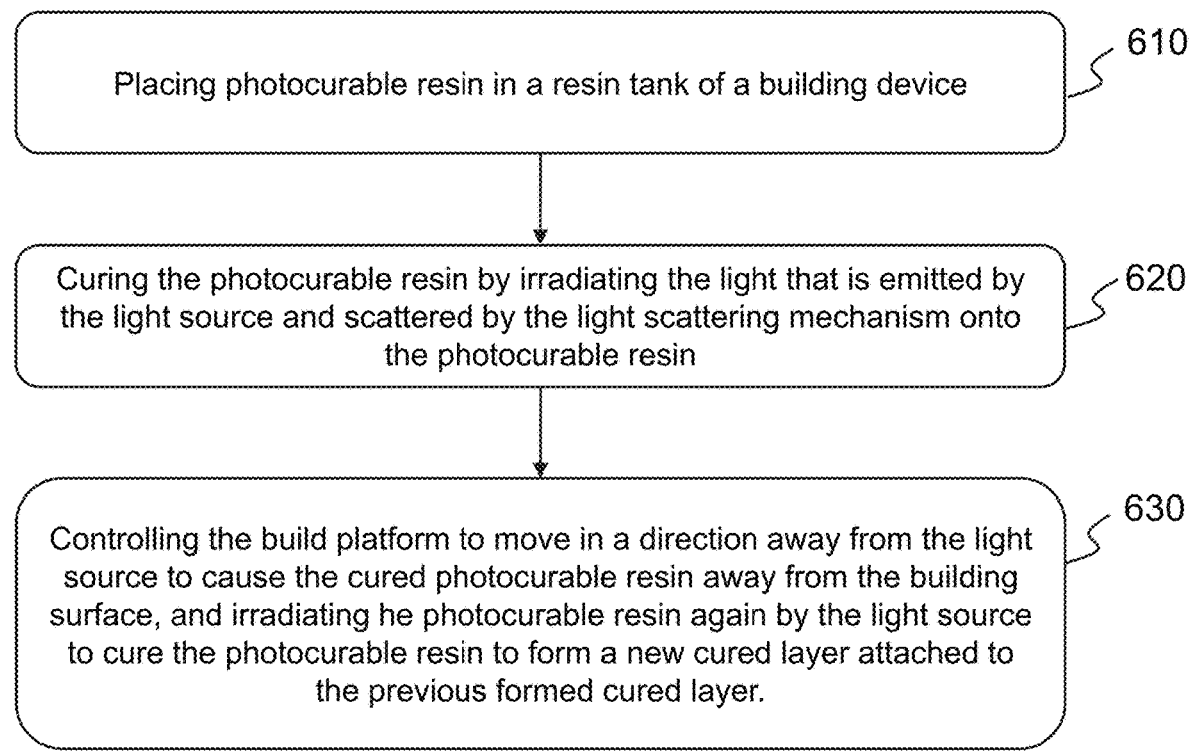
FIG. 6 is a flowchart illustrating an exemplary additive manufacturing method according to some embodiments of the present disclosure.

FIG. 6 is a flowchart illustrating an exemplary additive manufacturing method according to some embodiments of the present disclosure.

Some embodiments of the present disclosure provide an additive manufacturing method for performing additive manufacturing based on the additive manufacturing device in any embodiments of the present disclosure. The additive manufacturing method may include a process 600. The process 600 may include the following operations.

In 610, photocurable resins may be placed in a resin tank of a building device.

In some embodiments, the photocurable resins may be placed in the resin tank of the building device, and the photocurable resins may be in a liquid state.

In some embodiments, a light scattering member may be placed between a light source and the building device, and the light scattering member may be capable of scattering light passing through the light scattering member.

In 620, the photocurable resins may be cured by irradiating the light that is emitted by the light source and scattered by the light scattering member onto the photocurable resins.

In some embodiments, the light emitted by the light source may be scattered by the light scattering member and then irradiated onto the photocurable resins to cure the photocurable resins, and the cured layer of the photocurable resins may be attached to a build platform.

In 630, the build platform may be controlled to move in a direction away from the light source to cause the cured photocurable resins to move away from the building surface. The photocurable resins may be irradiated again by the light source to cure the photocurable resins to form a new cured layer attached to the previous formed cured layer.

In some embodiments, the building device may be controlled to move in the direction away from the light source to cause the cured photocurable resins to move away from the building surface to print the new cured layer. In some embodiments, the building device may include a lifting member and a build platform. The cured layer may be attached to the build platform. The lifting member may be controlled to drive the building platform to move a preset distance in the direction away from the light source to cause the previous cured layer to be separated from the building surface, accordingly, the liquid photocurable resins may flow between the previous cured layer and the building surface and be irradiated by the light emitted by the light source and scattered by the light scattering member to form a new cured layer on the previous cured layer. A 3D object may be printed layer by layer by repeating the above steps. In some embodiments, the new cured layer and the previous cured layer may be an integrated structure.

The possible beneficial effects of the embodiments of the present disclosure may include but are not limited to the following descriptions.

(1) Based on the structure of the additive manufacturing device in the embodiments of the present disclosure, the light image formed by the light source on the building surface may be composed of a plurality of pixels. For a single pixel, the light intensity in the light image corresponding to the pixel may vary with the inner-pixel location, the light intensity may be weak in the edge region of the pixel, and the light intensity may be strong in the center region of the pixel. After the light emitted by the light source is scattered by the light scattering member, due to the change of an angle of the light, the light intensity in the edge region of a single pixel is enhanced and the light intensity in the center region of the single pixel is weakened, accordingly, boundaries between the pixels are blurred, thereby reducing protrusions and depressions on a surface of the printed 3D object and improving the transparency of the printed 3D object.

(2) After the light scattering member is used, the light intensity at different inner-pixel locations may be adjusted, so that the ratio of the maximum value $I_{max}$ to the minimum value $I_{min}$ of the light intensity I of the single pixel of a light image formed by the light source on the building surface reduces, accordingly, a difference of the light intensities at different inner-pixel locations is reduced, thereby improving the surface smoothness and the transparency or clarity of the printed 3D object.

(3) After the light scattering member is used, the FWHM1 of the Gaussian distribution curve of the light intensity I in a single pixel formed by the light source on the building surface increases, and the larger the FWHM is, the smoother the Gaussian distribution curve is, the smaller the difference of the light intensities corresponding to different inner-pixel locations is, and the higher the transparency of the printed 3D object is.

(4) The difference between the light intensity at the edge region of a single pixel and the light intensity in the center region of the pixel is reduced by setting the light uniforming device, thereby blurring the boundaries of the pixels on the surface of the printed 3D object and improving the transparency and clarity of the printed 3D object.

(5) The boundaries of the pixels are blurred by setting the light source profile modifier, thereby improving the transparency of the printed 3D object.

(6) The light source shifter is configured to shift the display chip of the digital light processing projection device, so that the output beam is shifted, and accordingly, the output beam moves rapidly clockwise or counterclockwise between adjacent pixels, thereby blurring the boundaries of the pixels and improving the transparency of the printed 3D object.

(7) The output beam of the light source scatters onto the building surface through the scattering layer to blur the boundaries of the pixels on the building surface, thereby improving the transparency and clarity of the printed 3D object.

It should be noted that different embodiments may have different beneficial effects. In different embodiments, the possible beneficial effects may be any one or a combination of the above beneficial effects, or any other possible beneficial effects.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These modifications, improvements, and amendments are intended to be suggested by the present disclosure, and are within the spirit and scope of the exemplary embodiments of the present disclosure.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An additive manufacturing device for manufacturing a transparent dental appliance, comprising
a light source configured to provide light to cure photocurable resins;
a building device including a resin tank configured to store the photocurable resins, the building device having a building surface on which the photocurable resins are cured; and
a light scattering member arranged between the light source and the building surface, the light scattering member being configured to alter a light propagation direction of the light from the light source to cause an inner-pixel light intensity change on the building surface,
wherein
the light scattering member includes a transparent scattering layer,
the transparent scattering layer includes a plastic layer that is in contact with the photocurable resins and an elastic layer that is not in contact with the photocurable resins, from which the transparent dental appliance is additively manufactured, the plastic layer having anti-sticking properties and being configured to separate the photocurable resins after curing, and the elastic layer having microstructures that are configured to increase scattering;
the plastic layer includes fluorinated ethylene propylene (FEP);
the elastic layer includes polytetrafluoroethylene (PTFE); and
the elastic layer includes an elastic medium and a reinforcing scaffold, and the elastic medium is filled in pores of the reinforcing scaffold.

2. The additive manufacturing device of claim 1, wherein
a first transparency T1 of a first print is formed by curing the photocurable resins on the building surface by the light that passes through the elastic layer,
a second transparency T2 of a second print is formed by curing the photocurable resins on the building surface by the light that does not pass through the elastic layer, and
the first transparency T1 is greater than the second transparency T2.

3. The additive manufacturing device of claim 1, wherein the building device further includes a build platform configured to move in a direction away from the light source to cause the cured photocurable resins to move away from the building surface.

4. The additive manufacturing device of claim 1, wherein
a first full-width at half of maximum (FWHM1) is a full-width at half of maximum (FWHM) of a Gaussian distribution curve of a light intensity in a single pixel on the building surface, wherein the single pixel is formed by the light that passes through the elastic layer,
a second full-width at half of maximum (FWHM2) is an FWHM of a Gaussian distribution curve of a light intensity in a single pixel on the building surface, wherein the single pixel is formed by the light that does not pass through the elastic layer, and the FWHM1 of at least one pixel is greater than the FWHM2 of at least one pixel.

5. The additive manufacturing device of claim 1, wherein a distance between the elastic layer and the building surface is less than a distance between the elastic layer and the light source, and the elastic layer is configured to adjust a distribution of an inner-pixel light intensity of the light source.

6. The additive manufacturing device of claim 5, wherein the light scattering member includes a light source profile modifier arranged on a light path of the light source and configured to modify profiles of the one or more pixels of the light source, the light source being a liquid crystal display light source.

7. The additive manufacturing device of claim 5, wherein the light scattering member includes a light uniforming sheet.

8. The additive manufacturing device of claim 5, wherein the light scattering member includes a glass structure, and the glass structure includes frosted glass, sandblasted glass, or etched glass.

9. The additive manufacturing device of claim 5, wherein the light scattering member further includes a light source shifter, the light source is a digital light processing projection device, and the light source shifter is configured to shift a display chip of the digital light processing projection device.

10. The additive manufacturing device of claim 1, wherein:
a first ratio A1 is a ratio of a maximum value to a minimum value of a light intensity in a first single pixel on the building surface, wherein the first single pixel is formed by the light that passes through the light scattering member,
a second ratio A2 is a ratio of a maximum value to a minimum value of a light intensity in a second single pixel on the building surface, wherein the second single pixel is formed by the light that does not pass through the light scattering member, and
the first ratio A1 of the first single pixel is less than the second ratio A2 of the second single pixel.

11. The additive manufacturing device of claim 1, wherein the reinforcing scaffold of the elastic layer has a microporous structure.

12. The additive manufacturing device of claim 11, wherein the microporous structure is formed by overlapping polymer microfibers.

13. The additive manufacturing device of claim 12, wherein a diameter of the polymer microfibers of the reinforcing scaffold is within a range of 50 nm-10 μm.

14. The additive manufacturing device of claim 1, wherein the reinforcing scaffold of the elastic layer is composed of short polymer fiber arranged in order, and the short polymer fibers are parallel to each other without overlapping.

15. The additive manufacturing device of claim 1, wherein the reinforcing scaffold of the elastic layer is composed of random arrangements of short polymer fibers.

16. The additive manufacturing device of claim 1, wherein
the elastic layer includes a porous PTFE film,
a surface of the porous PTFE film has a spider web microporous structure that is formed by entanglement of a plurality of PTFE microfibers.

17. The additive manufacturing device of claim 16, wherein the pores of the PTFE film are formed between the plurality of PTFE microfibers, and a diameter of the pores of the PTFE film is within a range of 50 nm-10 μm.

18. The additive manufacturing device of claim 16, wherein a longitudinal cross-section of the pores of the PTFE film is a network structure.

19. The additive manufacturing device of claim 16, wherein the reinforcing scaffold and the elastic medium of the elastic layer form a solid-solid interface to scatter light passing through the elastic layer.

20. The additive manufacturing device of claim 16, wherein a material of the elastic medium of the elastic layer is elastomer.

21. An additive manufacturing method for manufacturing a transparent dental appliance, comprising:
placing photocurable resins in a resin tank of a building device; and
curing the photocurable resins to produce the transparent dental appliance by irradiating the light that is emitted by a light source and scattered by a light scattering member onto the photocurable resins, the light scattering member being arranged between the light source and the building surface, the light scattering member being configured to alter a light propagation direction of the light from the light source to cause an inner-pixel light intensity change on the building surface,
wherein
the light scattering member includes a transparent scattering layer,
the transparent scattering layer includes a plastic layer that is in contact with the photocurable resins and an elastic layer that is not in contact with the photocurable resins, from which the transparent dental appliance is additively manufactured, the plastic layer having anti-sticking properties and being configured to separate the photocurable resins after curing, and the elastic layer having microstructures that are configured to increase scattering;
the plastic layer includes fluorinated ethylene propylene (FEP);
the elastic layer includes polytetrafluoroethylene (PTFE); and
the elastic layer includes an elastic medium and a reinforcing scaffold, and the elastic medium is filled in pores of the reinforcing scaffold.

22. The additive manufacturing method of claim 21, further comprising:
separating the cured photocurable resins from the plastic layer after curing.

23. The additive manufacturing method of claim 21, wherein
the elastic layer is adjusted so that the light intensities at different inner-pixel locations are adjusted, reducing the ratio of a maximum value $I_{max}$ to a minimum value $I_{min}$ of the light intensity I of a third single pixel formed by the light source on the building surface.

* * * * *